(12) United States Patent
Kitagawa

(10) Patent No.: US 10,047,687 B2
(45) Date of Patent: Aug. 14, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Eiki Kitagawa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/550,944

(22) PCT Filed: Feb. 8, 2016

(86) PCT No.: PCT/IB2016/000094
§ 371 (c)(1),
(2) Date: Aug. 14, 2017

(87) PCT Pub. No.: WO2016/132197
PCT Pub. Date: Aug. 25, 2016

(65) Prior Publication Data
US 2018/0030909 A1 Feb. 1, 2018

(30) Foreign Application Priority Data
Feb. 17, 2015 (JP) ................................ 2015-028874

(51) Int. Cl.
*F02D 35/02* (2006.01)
*F02P 5/153* (2006.01)
*F02D 41/14* (2006.01)

(52) U.S. Cl.
CPC ......... *F02D 35/023* (2013.01); *F02D 35/024* (2013.01); *F02D 35/026* (2013.01);
(Continued)

(58) Field of Classification Search
CPC .... F02D 35/023; F02D 35/024; F02D 35/026; F02D 41/1458; F02P 5/153
(Continued)

(56) References Cited

U.S. PATENT DOCUMENTS

| 2006/0129304 A1 | 6/2006 | Takemura et al. |
| 2008/0195294 A1* | 8/2008 | Moriya ................ F02D 35/023 701/103 |
| 2008/0319632 A1 | 12/2008 | Miyashita et al. |

FOREIGN PATENT DOCUMENTS

| EP | 3078840 A1 | 10/2016 |
| JP | 2006-169996 A | 6/2006 |

(Continued)

*Primary Examiner* — Mahmoud Gimie
(74) *Attorney, Agent, or Firm* — Hunton Andrews Kurth LLP

(57) ABSTRACT

A control device for an internal combustion engine includes an in-cylinder pressure sensor, a crank angle sensor, and an electronic control unit. The electronic control unit is configured to calculate a correlation index value showing a degree of a correlation between a actually measured data of a combustion mass ratio and reference data of the combustion mass ratio based on an operating condition of the internal combustion engine. The electronic control unit is configured to, in a case where the correlation index value is lower than a determination value, prohibit the actually measured value of the specific ratio combustion point pertaining to a combustion cycle in which the correlation index value is calculated from being reflected in the engine control or reduce a degree of the reflection in the engine control compared to a case where the correlation index value is equal to or higher than the determination value.

7 Claims, 12 Drawing Sheets

(52) U.S. Cl.
CPC ....... *F02D 35/028* (2013.01); *F02D 41/1458* (2013.01); *F02P 5/153* (2013.01)

(58) Field of Classification Search
USPC .......................................... 123/435; 701/102
See application file for complete search history.

(56) References Cited

FOREIGN PATENT DOCUMENTS

| | | |
|---|---|---|
| JP | 2008-069713 A | 3/2008 |
| JP | 2009-138549 A | 6/2009 |
| JP | 2011-106334 A | 6/2011 |
| JP | 2016-153641 A | 8/2016 |

\* cited by examiner

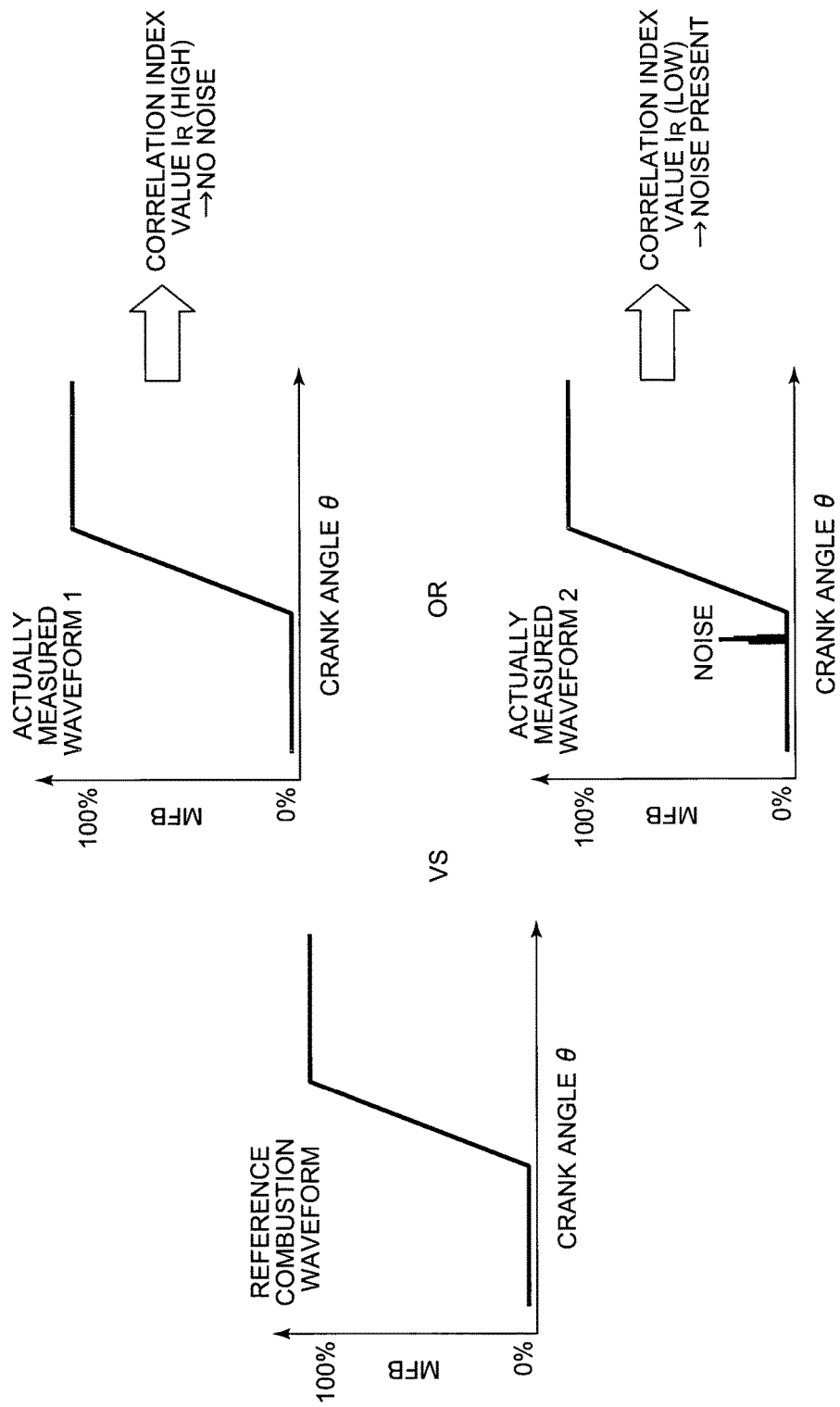

CONTROL DEVICE FOR INTERNAL COMBUSTION ENGINE

CROSS-REFERENCE TO RELATED APPLICATIONS

This is a national phase application based on the PCT International Patent Application No. PCT/IB2016/000094 filed Feb. 8, 2016, claiming priority to Japanese Patent Application No. 2015-028874 filed Feb. 17, 2015, the entire contents of both of which are incorporated herein by reference.

BACKGROUND OF THE INVENTION

1. Field of the Invention

The invention relates to a control device for an internal combustion engine and, more particularly, to a control device for an internal combustion engine that is preferable as a device for controlling an internal combustion engine which is provided with an in-cylinder pressure sensor.

2. Description of Related Art

In the related art, a combustion control device for an internal combustion engine that is provided with an in-cylinder pressure sensor is disclosed in, for example, Japanese Patent Application Publication No. 2008-069713 (JP 2008-069713 A). This combustion control device according to the related art calculates data of a crank angle-synchronized combustion mass ratio by using the in-cylinder pressure sensor and a crank angle sensor and calculates an actual combustion start point and a combustion center-of-gravity point based on the data. In a case where a difference that is obtained by subtracting the actual combustion start point from the combustion center-of-gravity point exceeds an upper limit value, the combustion control device determines that combustion deteriorates and takes a combustion improvement measure such as fuel injection quantity increase. In JP 2008-069713 A, an appropriate value with a combustion mass ratio of 10% to 30% is used as an example of the actual combustion start point, which is the crank angle at which the in-cylinder combustion actually starts, and an appropriate value with a combustion mass ratio of 40% to 60% is used as an example of the combustion center-of-gravity point.

SUMMARY OF THE INVENTION

Due to various factors, a noise might be superimposed on an output signal of the in-cylinder pressure sensor. As disclosed in JP 2008-069713 A, in the case of an engine control based on a crank angle at which the combustion mass ratio reaches a specific combustion mass ratio (hereinafter, referred to as a "specific ratio combustion point"), the specific ratio combustion point is calculated based on actually measured data of the combustion mass ratio (MFB). When the noise is superimposed on the output signal of the in-cylinder pressure sensor, the noise is superimposed on the actually measured data of the MFB based on actually measured data of an in-cylinder pressure as well. As a result, an error that is attributable to the noise might occur with respect to the specific ratio combustion point used in the engine control. When the engine control based on the specific ratio combustion point is performed without any consideration regarding the noise, accuracy of the engine control might be reduced. Accordingly, in the case of the engine control based on the specific ratio combustion point, it is required that the superimposition of the noise on the actually measured data of the combustion mass ratio can be appropriately detected and an appropriate countermeasure is taken in a case where the noise is detected.

The invention provides a control device for an internal combustion engine that detects a noise superimposed on actually measured data of a combustion mass ratio calculated based on an output of an in-cylinder pressure sensor and is capable of inhibiting an error in a specific ratio combustion point attributable to the noise from being reflected as it is in an engine control.

A control device for an internal combustion engine according to an aspect of the invention includes an in-cylinder pressure sensor, a crank angle sensor, and an electronic control unit. The in-cylinder pressure sensor is configured to detect an in-cylinder pressure of the internal combustion engine. The crank angle sensor is configured to detect a crank angle of the internal combustion engine. The electronic control unit is configured to calculate actually measured data of a combustion mass ratio synchronized with the crank angle based on the in-cylinder pressure detected by the in-cylinder pressure sensor and the crank angle detected by the crank angle sensor. The electronic control unit is configured to calculate an actually measured value of a specific ratio combustion point as the crank angle at which the combustion mass ratio reaches a specific ratio based on the actually measured data of the combustion mass ratio. The electronic control unit is configured to execute an engine control for controlling an actuator of the internal combustion engine based on the actually measured value of the specific ratio combustion point. The electronic control unit is configured to calculate a correlation index value showing a degree of a correlation between the actually measured data of the combustion mass ratio and reference data of the combustion mass ratio based on an operating condition of the internal combustion engine. The electronic control unit is configured to, in a case where the correlation index value is lower than a determination value, prohibit the actually measured value of the specific ratio combustion point pertaining to a combustion cycle in which the correlation index value is calculated from being reflected in the engine control or reduce a degree of the reflection in the engine control compared to a case where the correlation index value is equal to or higher than the determination value.

In the control device for an internal combustion engine according to the aspect described above, the electronic control unit may be configured to calculate the correlation index value by using a cross-correlation function.

In the control device for an internal combustion engine according to the aspect described above, a calculation period as a crank angle period as a target of the calculation of the correlation index value may include at least one of a first calculation period as the crank angle period from a first crank angle preceding a combustion start point to a first specific ratio combustion point following the combustion start point and a second calculation period as the crank angle period from a second specific ratio combustion point following the first specific ratio combustion point to a second crank angle following a combustion end point. The combustion mass ratio at the first specific ratio combustion point may be lower than the combustion mass ratio at the second specific ratio combustion point. The crank angle period from the first specific ratio combustion point to the second specific ratio combustion point may include at least a pair of data relating to the actually measured data and the reference data of the combustion mass ratio as a target of the calculation of the correlation index value.

In the control device for an internal combustion engine according to the aspect described above, the engine control may include a first engine control based on a combustion center-of-gravity point as one of the specific ratio combustion points and a second engine control based on a control target combustion point included in the crank angle period from the combustion start point to the first specific ratio combustion point and positioned ahead of the combustion center-of-gravity point. The electronic control unit may be configured to prohibit an actually measured value of the combustion center-of-gravity point and an actually measured value of the control target combustion point pertaining to the combustion cycle in which the correlation index value is calculated from being respectively reflected in the first engine control and the second engine control or reduce degrees of the respective reflections in the first engine control and the second engine control compared to the case where the correlation index value is equal to or higher than the determination value in a case where the correlation index value calculated with the second calculation period used as a target is lower than the determination value.

In the control device for an internal combustion engine according to the aspect described above, the engine control may include the first engine control based on the combustion center-of-gravity point as one of the specific ratio combustion points and the second engine control based on the control target combustion point included in the crank angle period from the combustion start point to the first specific ratio combustion point and positioned ahead of the combustion center-of-gravity point. The electronic control unit may be configured to prohibit the actually measured value of the control target combustion point pertaining to the combustion cycle in which a first correlation index value is calculated from being reflected in the second engine control or reduce a degree of the reflection in the second engine control compared to a case where a second correlation index value is equal to or higher than a second determination value and the first correlation index value is equal to or higher than a first determination value in a case where the second correlation index value calculated with the second calculation period used as the target is equal to or higher than the second determination value and the first correlation index value calculated with the first calculation period used as the target is lower than the first determination value.

In the control device for an internal combustion engine according to the aspect described above, the engine control may include a third engine control based on a third specific ratio combustion point or a first parameter defined based on the third specific ratio combustion point and a fourth engine control based on a fourth specific ratio combustion point or a second parameter defined based on the fourth specific ratio combustion point. The reference data of the combustion mass ratio pertaining to at least a crank angle period from a 10% combustion point to a 90% combustion point in a combustion period may be generated based on a first target value and a second target value and by at least one of linear interpolation and linear extrapolation. The first target value may be one of the third specific ratio combustion points specified from a target value of the third specific ratio combustion point or a target value of the first parameter. The second target value may be one of the fourth specific ratio combustion points specified from a target value of the fourth specific ratio combustion point or a target value of the second parameter. The reference data of the combustion mass ratio pertaining to the third crank angle period may be data with a combustion mass ratio of 0% in a case where the reference data of the combustion mass ratio includes a third crank angle period as the crank angle period preceding the combustion period. The reference data of the combustion mass ratio pertaining to the fourth crank angle period may be data with a combustion mass ratio of 100% in a case where the reference data of the combustion mass ratio includes a fourth crank angle period as the crank angle period following the combustion period.

In the control device for an internal combustion engine according to the aspect described above, the third specific ratio combustion point and the fourth specific ratio combustion point may be specific ratio combustion points in the crank angle period from the 10% combustion point to the 90% combustion point.

In the control device for an internal combustion engine according to the above-described aspect, the correlation index value showing the degree of the correlation between the actually measured data of the combustion mass ratio based on the in-cylinder pressure detected by the in-cylinder pressure sensor and the reference data of the combustion mass ratio based on the operating condition of the internal combustion engine is calculated. The correlation index value decreases (shows a low degree of the correlation) when noise is superimposed on the actually measured data of the combustion mass ratio. Accordingly, the noise that is superimposed on the actually measured data of the combustion mass ratio can be detected. In the case where the correlation index value is lower than the determination value, the actually measured value of the specific ratio combustion point pertaining to the combustion cycle in which the correlation index value is calculated is prohibited from being reflected in the engine control or the degree of the reflection in the engine control is reduced compared to the case where the correlation index value is equal to or higher than the determination value. In this manner, an error in the specific ratio combustion point that is attributable to the noise can be inhibited from being reflected in the engine control as it is.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a diagram for showing a noise detection technique according to Embodiment 1 of the invention;

DETAILED DESCRIPTION OF EMBODIMENTS

Embodiment 1

Hereinafter, Embodiment 1 of the invention will be described with reference to FIGS. 1 to 8.

[System Configuration of Embodiment 1]

Figure 1:
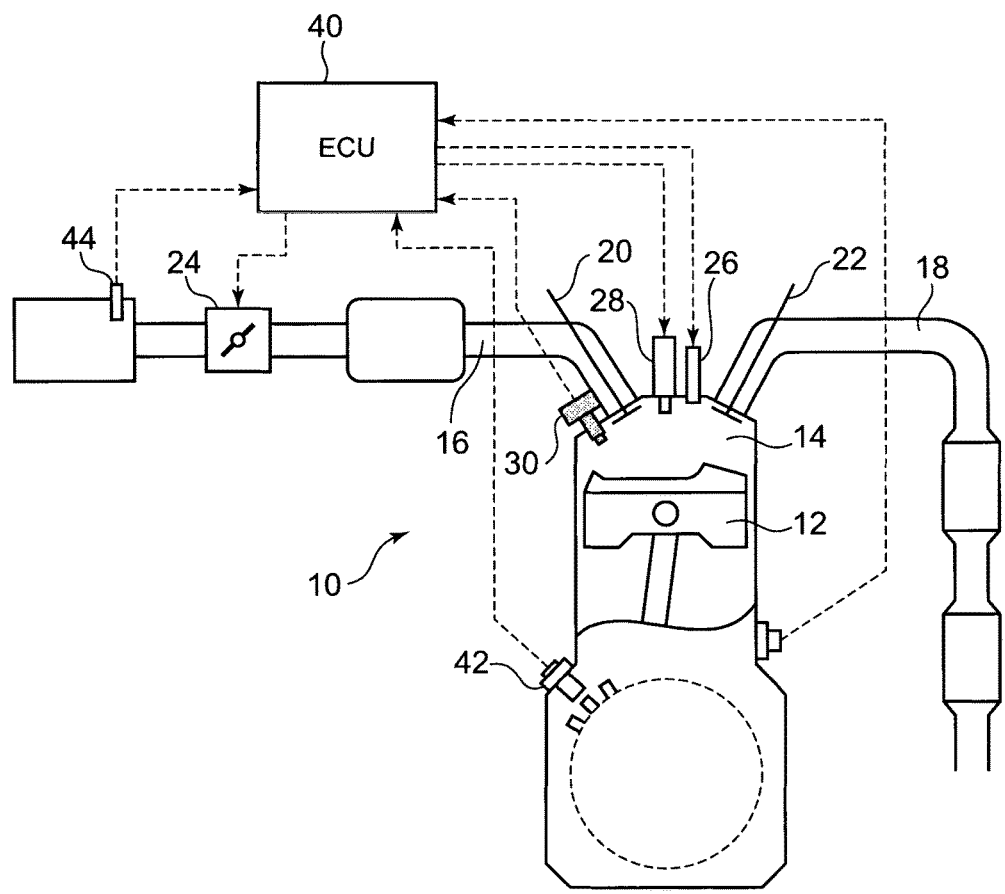
FIG. 1 is a drawing for showing a system configuration of an internal combustion engine according to Embodiment 1 of the invention.

FIG. 1 is a drawing for showing a system configuration of an internal combustion engine 10 according to Embodiment 1 of the invention. A system that is illustrated in FIG. 1 is provided with the spark ignition-type internal combustion engine 10. A piston 12 is disposed in a cylinder of the internal combustion engine 10. A combustion chamber 14 is formed on a top portion side of the piston 12 in the cylinder. An intake passage 16 and an exhaust passage 18 communicate with the combustion chamber 14.

An intake valve 20 that opens or closes an intake port is disposed in the intake port of the intake passage 16. An exhaust valve 22 that opens or closes an exhaust port is disposed in the exhaust port of the exhaust passage 18. An electronically controlled throttle valve 24 is disposed in the intake passage 16. A fuel injection valve 26 for injecting a fuel directly into the combustion chamber 14 (into the cylinder) and an ignition device (only a spark plug being illustrated herein) 28 for igniting an air-fuel mixture are disposed in each cylinder of the internal combustion engine 10. An in-cylinder pressure sensor 30 for detecting an in-cylinder pressure is incorporated into each cylinder.

The system according to this embodiment is provided with a drive circuit (not illustrated) for driving various actuators described below and various sensors and the like described below along with an electronic control unit (ECU) 40 as a control device that controls the internal combustion engine 10. The ECU 40 is provided with an I/O interface, a memory, and a central processing unit (CPU). The I/O interface is disposed to receive sensor signals from various sensors attached to the internal combustion engine 10 or a vehicle in which the internal combustion engine 10 is mounted and output operation signals to various actuators for controlling the internal combustion engine 10. Various control programs, maps, and the like for controlling the internal combustion engine 10 are stored in the memory. The CPU reads the control programs and the like from the memory, executes the control programs and the like, and generates the operation signals for the various actuators based on the received sensor signals.

The sensors from which the ECU 40 receives the signals include not only the above-described in-cylinder pressure sensor 30 but also various sensors for acquiring engine operation states such as a crank angle sensor 42 and an air flow meter 44. The crank angle sensor 42 is placed in the vicinity of a crankshaft (not illustrated). The air flow meter 44 is placed in the vicinity of an inlet of the intake passage 16.

The actuators to which the ECU 40 outputs the operation signals include various actuators for engine operation control such as the throttle valve 24, the fuel injection valve 26, and the ignition device 28 described above. The ECU 40 also functions to acquire an output signal of the in-cylinder pressure sensor 30 through synchronization with a crank angle and AD conversion. Accordingly, the in-cylinder pressure at any crank angle timing can be detected within a range that is allowed by a resolution of the AD conversion. In addition, a map that defines a relationship between the crank angle and an in-cylinder volume is stored in the ECU 40, and the ECU 40 can calculate the in-cylinder volume corresponding to the crank angle with reference to the map.

[Combustion Control According to Embodiment 1] (Calculation of Actually Measured Data of MFB Using in-Cylinder Pressure Sensor)

Figure 2:
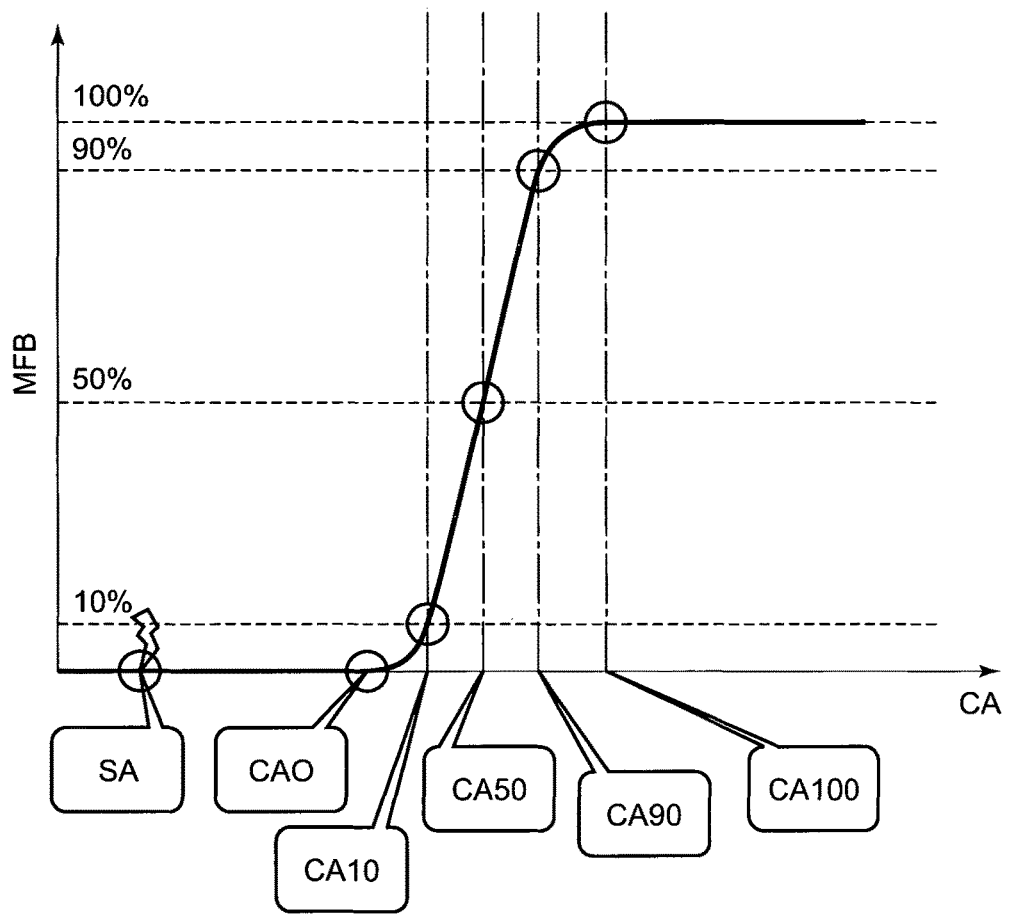
FIG. 2 is a drawing illustrating an ignition timing and a combustion mass ratio waveform.

FIG. 2 is a drawing illustrating an ignition timing and a combustion mass ratio waveform. With the system according to this embodiment that is provided with the in-cylinder pressure sensor 30 and the crank angle sensor 42, actually measured data of an in-cylinder pressure P synchronized with the crank angle (more specifically, a set of the in-cylinder pressures P calculated as values for respective predetermined crank angles) can be acquired in each cycle of the internal combustion engine 10. An in-cylinder heat generation amount Q at any crank angle θ can be calculated in accordance with the following Equations (1) and (2) and with the actually measured data of the in-cylinder pressure P obtained and the first law of thermodynamics. Then, the combustion mass ratio at any crank angle θ (hereinafter, referred to as the "MFB") can be calculated in accordance with the following Equation (3) and with the actually measured data of the calculated in-cylinder heat generation amount Q (set of the heat generation amounts Q calculated as values for the respective predetermined crank angles). Then, the actually measured data of the MFB synchronized with the crank angle (set of actually measured MFBs) can be calculated by the MFB calculation processing being executed for each predetermined crank angle. The actually measured data of the MFB is calculated in a combustion period and a predetermined crank angle period preceding or following the combustion period (herein, for example, a crank angle period from a closing timing IVC of the intake valve 20 to an opening timing EVO of the exhaust valve 22).

$$dQ/d\theta = \frac{1}{\kappa - 1} \times \left( V \times \frac{dP}{d\theta} + P \times \kappa \times \frac{dV}{d\theta} \right) \quad (1)$$

$$Q = \sum \frac{dQ}{d\theta} \quad (2)$$

$$MFB = \frac{Q(\theta) - Q(\theta_{min})}{Q(\theta_{max}) - Q(\theta_{min})} \times 100 \quad (3)$$

V in Equation (1) above represents the in-cylinder volume, and κ in Equation (1) above represents a specific heat ratio of in-cylinder gas. $\theta_{min}$ in Equation (3) above represents a combustion start point, and $\theta_{max}$ in Equation (3) above represents a combustion end point.

With the actually measured data of the MFB calculated based on the above-described technique, the crank angle in a case where the MFB reaches a specific ratio α (%) (hereinafter, referred to as a "specific ratio combustion point" denoted by "CAα") can be acquired. When the specific ratio combustion point CAα is acquired, a value of the specific ratio α can be successfully included in the actually measured data of the MFB. In a case where the value is not included, however, the specific ratio combustion point CAα can be calculated by interpolation based on the actually measured data positioned on both sides of the specific ratio α. In this specification, the CAα that is acquired by the use of the actually measured data of the MFB will be referred to as an "actually measured CAα". Hereinafter, a typical one of the specific ratio combustion point CAα will be described with reference to FIG. 2. Combustion in the cylinder is initiated with an ignition delay after the ignition of the air-fuel mixture is performed at an ignition timing SA. This combustion start point ($\theta_{min}$ in Equation (3) above), that is, the crank angle in the event of a rise in the MFB will be referred to as a CA0. The crank angle period (CA0-CA10) from the CA0 to a crank angle CA10 at which the MFB reaches 10% corresponds to an initial combustion period, and a crank angle period (CA10-CA90) from the CA10 to a crank angle CA90 at which the MFB reaches 90% corresponds to a main combustion period. In addition, in this embodiment, a crank angle CA50 at which the MFB reaches 50% is used as a combustion center-of-gravity point. A crank angle CA100 at which the MFB reaches 100% corresponds to the combustion end point ($\theta_{max}$ in Equation (3) above) at which the heat generation amount Q reaches its maximum value. The combustion period is identified as a crank angle period from the CA0 to the CA100.

(Engine Control Using CAα)

Figure 3:
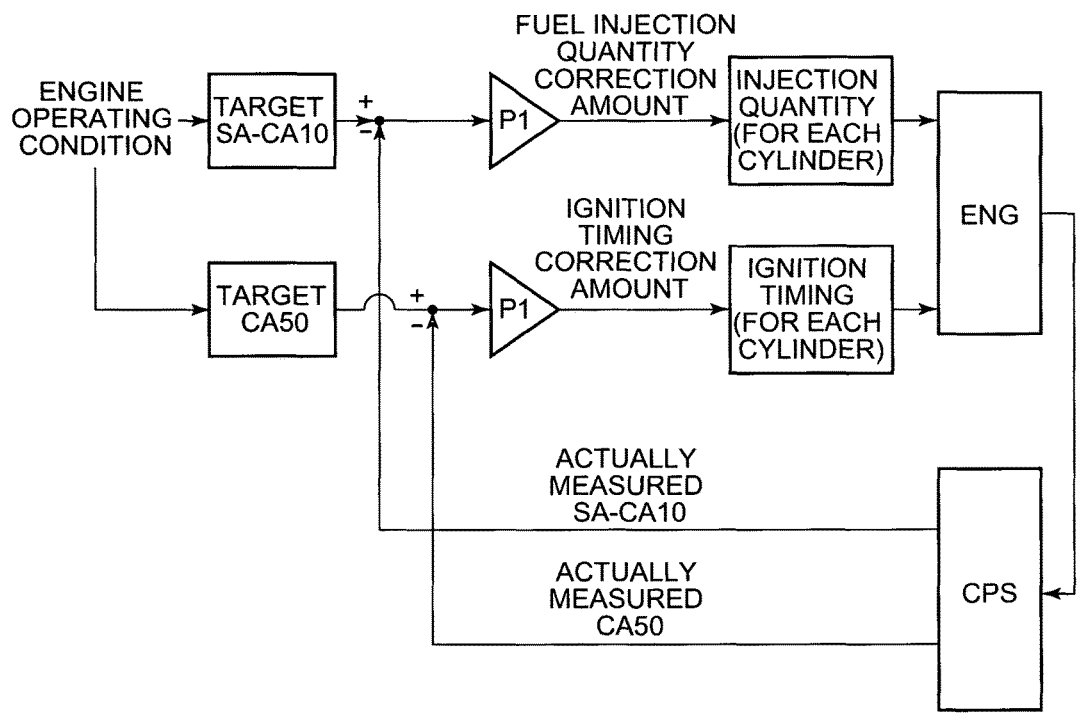
FIG. 3 is a block diagram for showing an overview of two types of feedback control executed by an ECU and using a CA10 and a CA50.

FIG. 3 is a block diagram for showing an overview of two types of feedback control executed by the ECU 40 and using the CA10 and the CA50. A control using the specific ratio combustion point CAα is included in the engine control that is performed by the ECU 40. Hereinafter, the two types of the feedback control respectively using the CA10 and the CA50 will be described as an example of the engine control using the specific ratio combustion point CAα. In this embodiment, these controls are executed during a lean burn operation that is performed at an (fuel lean) air-fuel ratio which is higher than a theoretical air-fuel ratio.

1. Fuel Injection Quantity Feedback Control Using SA-CA10

In this feedback control, the CA10 that is a 10% combustion point is used as follows instead of being used as a direct target value, that is, in this specification, the crank angle period from the ignition timing SA to the CA10 will be referred to as a "SA-CA10". More specifically, the SA-CA10 that is a difference which is obtained by subtracting the ignition timing SA from the actually measured CA10 will be referred to as an "actually measured SA-CA10". In this embodiment, a final target ignition timing (indication value of an ignition timing of next cycle) that is adjusted through an ignition timing feedback control using the CA50 (described later) is used as the ignition timing SA used in the calculation of the actually measured SA-CA10.

Figure 4:
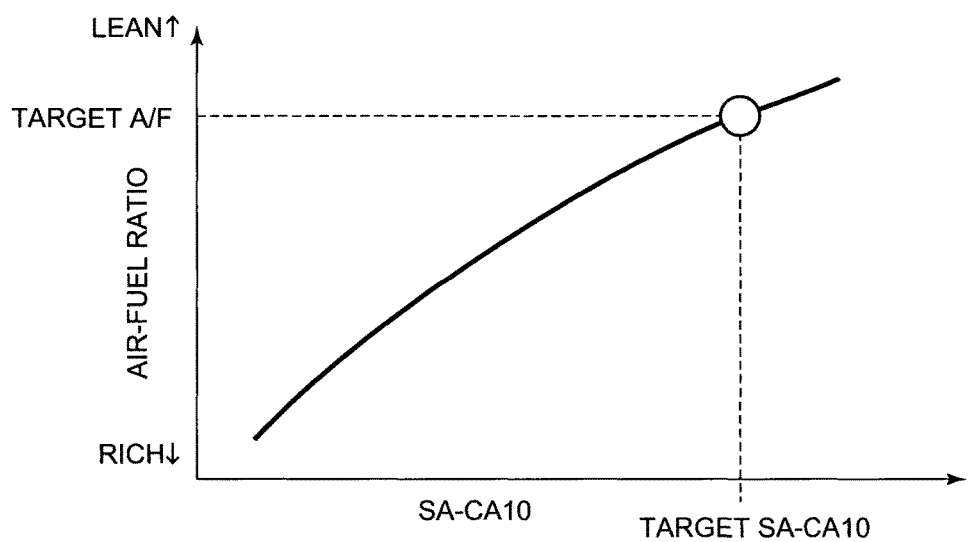
FIG. 4 is a diagram illustrating a relationship between an air-fuel ratio and an SA-CA10.

FIG. 4 is a diagram illustrating a relationship between an air-fuel ratio and the SA-CA10. This relationship pertains to a lean air-fuel ratio region on a lean side with respect to the theoretical air-fuel ratio and the same operating condition (more specifically, an engine operating condition having the same suctioned air amount and engine rotation speed). The SA-CA10 is a parameter that is representative of the ignition delay, and the SA-CA10 and the air-fuel ratio have a certain correlation. More specifically, in the lean air-fuel ratio region, the SA-CA10 increases as the air-fuel ratio becomes leaner as illustrated in FIG. 4. Accordingly, when this relationship is used, a target SA-CA10 corresponding to a desired target air-fuel ratio can be obtained. In addition, in this embodiment, a feedback control for adjusting the fuel injection quantity so that the actually measured SA-CA10 approaches the target SA-CA10 (hereinafter, simply referred to as an "SA-CA10 feedback control") is executed during the lean burn operation.

As illustrated in FIG. 3, the target SA-CA10 depending on the engine operating conditions (more specifically, the target air-fuel ratio, the engine rotation speed, and the suctioned air amount) is set in the SA-CA10 feedback control. The actually measured SA-CA10 is calculated for each cycle in each cylinder. In addition, in the SA-CA10 feedback control, a PI control is used as an example so that the fuel injection quantity is adjusted and the target SA-CA10 and the actually measured SA-CA10 have no difference. In this PI control, the difference between the target SA-CA10 and the actually measured SA-CA10 and predetermined PI gains (proportional term gain and integral term gain) are used so that a fuel injection quantity correction amount depending on magnitudes of the difference and an integrated value thereof is calculated. The correction amount that is calculated for each cylinder is reflected in a basic fuel injection quantity of the cylinder as a target. In this manner, the fuel injection quantity for supply to the cylinder in the subsequent cycle is adjusted (corrected) through the SA-CA10 feedback control.

According to the SA-CA10 feedback control, in the cylinder where the actually measured SA-CA10 less than the target SA-CA10 is obtained, a correction for decreasing the fuel injection quantity used in the subsequent cycle is executed so that the actually measured SA-CA10 is increased by the air-fuel ratio becoming leaner. In contrast, in the cylinder where the actually measured SA-CA10 more than the target SA-CA10 is obtained, a correction for increasing the fuel injection quantity used in the subsequent cycle is executed so that the actually measured SA-CA10 is decreased by the air-fuel ratio becoming richer.

According to the SA-CA10 feedback control, the parameter of the SA-CA10 that has a high degree of correlation with the air-fuel ratio is used, and thus the air-fuel ratio can be controlled to reach an aimed value (target air-fuel ratio) during the lean burn operation. Accordingly, the air-fuel ratio can be controlled near a lean limit by the target SA-CA10 being set to a value corresponding to an air-fuel ratio close to a lean combustion limit. Accordingly, low fuel consumption and low NOx discharge can be realized.

2. Ignition Timing Feedback Control Using CA50

An optimum ignition timing (so-called minimum advance for the best torque (MBT) ignition timing) changes depending on the air-fuel ratio. Accordingly, the MBT ignition timing changes when the air-fuel ratio changes through the SA-CA10 feedback control. The CA50 in a case where the MBT ignition timing is obtained rarely changes with respect to the air-fuel ratio in the lean air-fuel ratio region. Accordingly, when the CA50 in a case where the MBT ignition timing is obtained is used as a target CA50 and the ignition timing is corrected so that the actually measured CA50 and the target CA50 have no difference, the ignition timing in the event of the lean burn operation can be adjusted to the MBT ignition timing without being affected by the change in the air-fuel ratio described above. In this embodiment, a feedback control for adjusting the ignition timing so that the actually measured CA50 approaches the target CA50 (hereinafter, simply referred to as a "CA50 feedback control") is executed along with the SA-CA10 feedback control during the lean burn operation.

As illustrated in FIG. 3, in the CA50 feedback control, the target CA50 for allowing the ignition timing to become the MBT ignition timing is set to a value depending on the engine operating conditions (more specifically, the target air-fuel ratio, the engine rotation speed, and the suctioned air amount). Herein, the CA50 feedback control is not necessarily limited to a control for obtaining the MBT ignition timing. In other words, the CA50 feedback control can also be used even in a case where a certain ignition timing other than the MBT ignition timing is a target value as in so-called retarded combustion. In this case, for example, the target CA50 may be set to change depending on a target ignition efficiency (index value showing a degree of divergence of the target value from the MBT ignition timing) in addition to the above-described engine operating conditions.

The actually measured CA50 is calculated for each cycle in each cylinder. In addition, in the CA50 feedback control, a PI control is used as an example so that the ignition timing is corrected with respect to a basic ignition timing and the target CA50 and the actually measured CA50 have no difference. The basic ignition timing is stored in advance in the ECU 40 as a value depending on the engine operating conditions (suctioned air amount and engine rotation speed in particular). In this PI control, the difference between the target CA50 and the actually measured CA50 and predetermined PI gains (proportional term gain and integral term gain) are used so that an ignition timing correction amount depending on magnitudes of the difference and an integrated value thereof is calculated. The correction amount that is calculated for each cylinder is reflected in the basic ignition timing of the cylinder as a target. In this manner, the ignition timing used for the cylinder in the subsequent cycle (target ignition timing) is adjusted (corrected) through the CA50 feedback control.

The value of the air-fuel ratio in the lean combustion limit changes by being affected by the ignition timing. When the ignition timing is retarded with respect to the MBT ignition timing, for example, the value of the air-fuel ratio in the lean combustion limit moves to a rich side compared to when the ignition timing is controlled to correspond to the MBT ignition timing. When the SA-CA10 feedback control is executed with the above-described effect of the ignition timing on the value of the air-fuel ratio in the lean combustion limit not taken into account, an accidental fire could occur in a case where the air-fuel ratio is lopsided to a value on the lean side by the SA-CA10 feedback control. In this embodiment, as a preferred aspect of the SA-CA10 feedback control, the SA-CA10 feedback control is performed only in a combustion cycle in a state where the CA50 feedback control is sufficiently converged (that is, a state where the ignition timing is sufficiently close to the MBT ignition timing). In addition, in this embodiment, the CA50 feedback control is given a higher response speed than the SA-CA10 feedback control so that a suitable frequency of implementation of the SA-CA10 feedback control is ensured while the SA-CA10 feedback control is performed according to this aspect. This response speed setting can be realized by, for example, the PI gains used in the CA50 feedback control exceeding the PI gains used in the SA-CA10 feedback control.

The SA-CA10 feedback control and the CA50 feedback control are executed for each cylinder according to the above-described aspect. The internal combustion engine 10 according to this embodiment is provided with the in-cylinder pressure sensor 30 in each cylinder. In the case of an internal combustion engine that is configured to be provided with an in-cylinder pressure sensor in only one representative cylinder, however, fuel injection quantity and ignition timing feedback controls for every cylinder may be performed by the use of the actually measured SA-CA10 and the actually measured CA50 based on the in-cylinder pressure that is obtained from the single in-cylinder pressure sensor.

[Noise Detection Technique and Countermeasure During Noise Detection According to Embodiment 1] (Noise Effect on Actually Measured Data of MFB)

Figure 5:
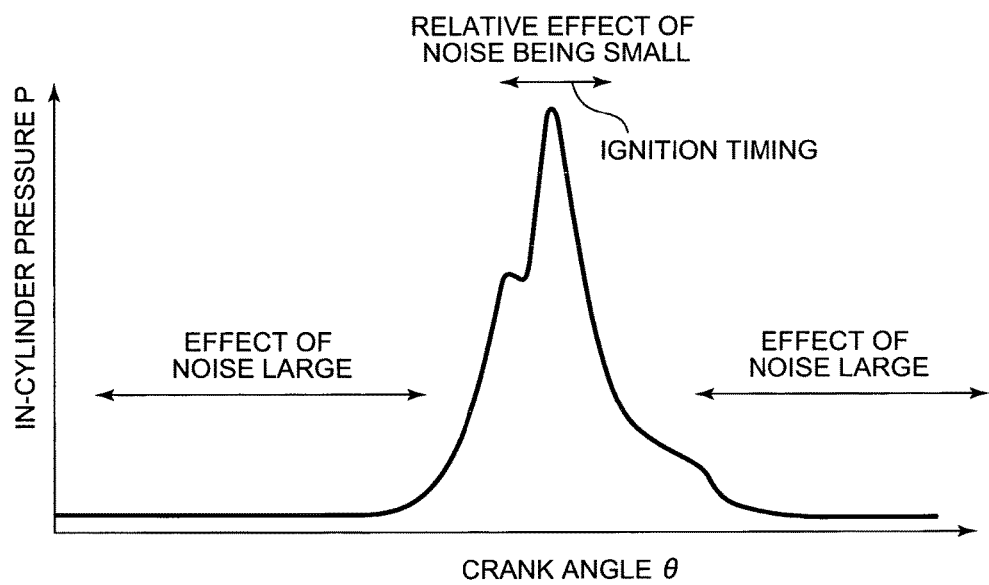
FIG. 5 is a P-θ diagrammatic drawing for showing a difference between degrees of effects of noise on respective regions of an in-cylinder pressure waveform in one combustion cycle.

FIG. 5 is a P-θ diagrammatic drawing for showing a difference between degrees of effects of noise on respective regions of an in-cylinder pressure waveform in one combustion cycle. Due to various factors, the noise might be superimposed on the output signal of the in-cylinder pressure sensor 30. As illustrated in FIG. 5, the effect of the noise on the actually measured waveform of the in-cylinder pressure in one combustion cycle can be said to be basically smaller in and around the combustion period (CA0-CA100) than in the preceding or following crank angle period. This is because the in-cylinder pressure sensor 30 has a relatively high output value and thus an S/N ratio, which is a ratio between a signal amount (Signal) and a noise amount (Noise), increases in and around the combustion period. Accordingly, the actually measured data of the MFB that is calculated based on the output of the in-cylinder pressure sensor 30 is affected as follows by the noise that is superimposed on the output signal of the in-cylinder pressure sensor 30.

In other words, when the noise is superimposed on the output signal of the in-cylinder pressure sensor 30, the effect of the noise appears in the actually measured data of the MFB as well as the actually measured data of the heat generation amount that is calculated based on the in-cylinder pressure. The MFB data pertaining to the combustion period is based on high-pressure in-cylinder pressure data on which the noise has a low degree of effect, and thus can be said to be less affected by the noise than the actually measured data of the MFB pertaining to the crank angle period preceding or following the combustion period. In addition, the following can be said with regard to the effect of the noise on the actually measured value of the specific ratio combustion point CAα that is calculated based on the actually measured data of the MFB, that is, the waveform of the MFB data is characterized by rising linearly in the main combustion period (CA10-CA90). Hence, basically, it can be said that an error attributable to the noise is less likely to occur at the specific ratio combustion point CAα in the main combustion period. Still, the combustion start point CA0 and the combustion end point CA100, which are regions where the waveform of the MFB data is bent, the combustion points in the vicinity of the combustion start point CA0 and the combustion end point CA100 (from the CA0 to the vicinity of the CA10 and from the CA90 to the vicinity of the CA100) are affected by the noise that is superimposed on the crank angle period preceding or following the combustion period, and thus the error attributable to the noise is more likely to occur than at the other combustion point such as the combustion center-of-gravity point (CA50) on a central side of the combustion period.

Figure 6A:
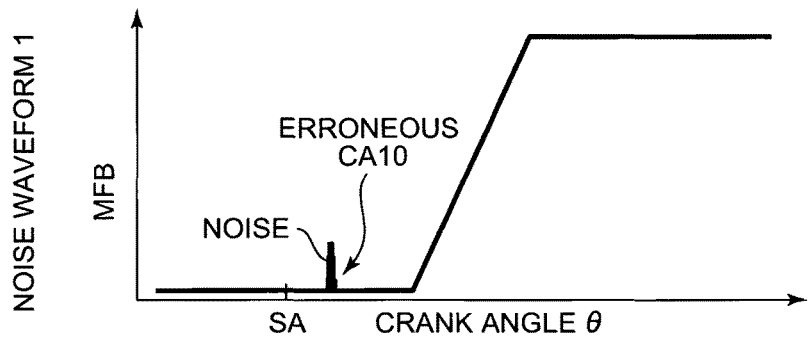
FIG. 6 is a diagram for showing the type of the noise that can be superimposed on the waveform of the MFB data and a problem attributable to the noise superimposition.
Figure 6B:
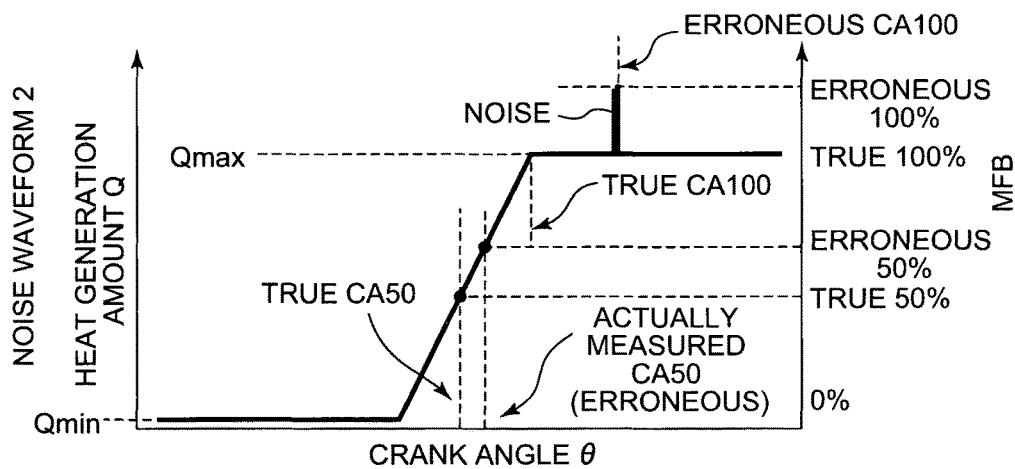
Figure 6C:
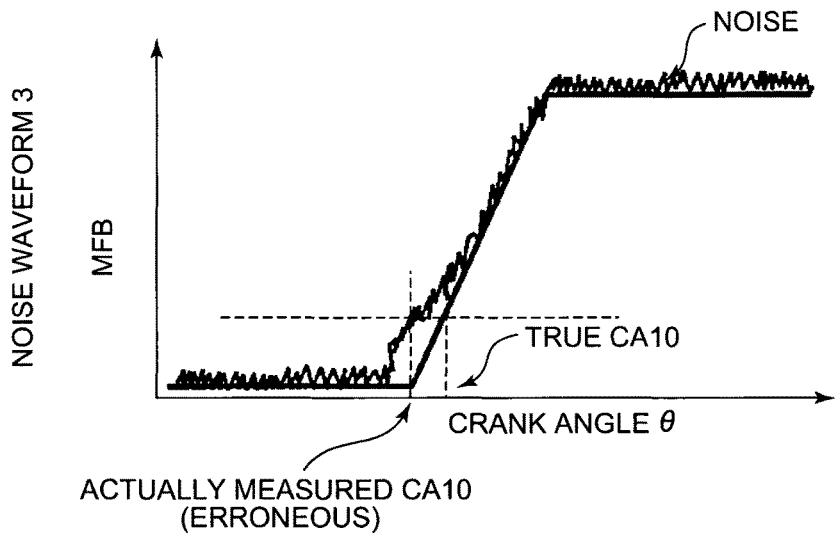

FIG. 6 is a diagram for showing the type of the noise that can be superimposed on the waveform of the MFB data and a problem attributable to the noise superimposition. Noise Waveform 1 in FIG. 6 is a schematic illustration of the waveform of the MFB data based on the in-cylinder pressure data on which a significant noise is superimposed in a spike shape at a crank angle timing following the ignition timing SA in the crank angle period preceding the combustion period. When the waveform of the actually measured data of the MFB acquired during the execution of the SA-CA10 feedback control is Noise Waveform 1, the crank angle in the vicinity of the data on which the spike-shaped noise is superimposed might be erroneously calculated as the CA10.

Noise Waveform 2 in FIG. 6 is a schematic illustration of the waveform of the heat generation amount data based on the in-cylinder pressure data on which a significant noise is superimposed in a spike shape in the crank angle period following the combustion period. The following problem arises in a case where the MFB data is calculated by the use of this noise-superimposed heat generation amount data, that is, the value of the heat generation amount data at the crank angle timing on which the noise is superimposed might be erroneously recognized as a maximum heat generation amount $Q_{max}$. This means an erroneous determination of the heat generation amount data in which the MFB reaches 100%. As a result, the CA100 is calculated with an error. Since the noise that is superimposed on the crank angle period following the combustion period has its effect as described above; the error attributable to the noise is likely to occur at the CA100 and the nearby combustion point. The effect of the noise that is superimposed in the aspect of Noise Waveform 2 decreases along with a separation to the CA0 side from the CA100, but an error occurs in the value of the other combustion point as well due to the error in the maximum heat generation amount $Q_{max}$ which is a reference of the MFB calculation. More specifically, the error occurs even at the combustion point near the center of the combustion period that is unlikely to be directly affected by the noise by nature, such as the CA50, as illustrated with Noise Waveform 2 in FIG. 6.

Noise Waveform 3 in FIG. 6 is a schematic illustration of the waveform of the MFB data based on the in-cylinder pressure data on which a similar level of noise is uniformly superimposed without exception on the combustion period and the crank angle period preceding or following the combustion period. Even in this case of overall noise superimposition, it can be said that the noise-superimposed MFB data has no effect even when used for control insofar as the level of the superimposed noise is low. However, the following problem arises in a case where a relatively high level of noise is superimposed on a wide range as in Noise Waveform 3, that is, because the output value of the in-cylinder pressure sensor is a relative pressure, a correction (absolute pressure correction) for turning the output value of the in-cylinder pressure into an absolute pressure is generally performed prior to a combustion analysis when the combustion analysis is performed in the form of, for example, MFB data calculation from the in-cylinder pressure data. Although detailed description of the absolute pressure correction processing will be omitted herein because the absolute pressure correction processing itself is known, the in-cylinder pressure data at crank angles at two predetermined points in the crank angle period preceding the combustion period are used in the absolute pressure correction. When the noise is superimposed in the aspect of Noise Waveform 3, an error occurs in the in-cylinder pressure data of the two points used in the absolute pressure correction, and thus an error occurs in the amount of the absolute pressure correction as well. This error in the absolute pressure correction amount gives, for example, an error such as a timing at which the heat generation amount Q rises becoming earlier than a true timing to the heat generation amount data. As a result, the value of the combustion point in an early stage of combustion such as the CA10 deviates from a true value as illustrated with the noise waveform in FIG. 6. In addition, the error in the absolute pressure correction amount might affect the combustion point near the combustion end point CA100 such as the CA90 as well as the combustion period in the early stage of combustion such as the CA10.

(Noise Detection Technique)

As illustrated with reference to FIG. 6, different types of noises can be superimposed on the output signal of the in-cylinder pressure sensor 30. In addition, in a case where it is assumed that the internal combustion engine 10 is used in various environments, it is difficult to discern in advance when and how the noise affecting the engine control is superimposed on the output signal. In a case where the above-described SA-CA10 feedback control and CA50 feedback control based on the output of the in-cylinder pressure sensor 30 are performed, however, the superimposition of the noise on the actually measured data of the MFB can be appropriately detected, and it is preferable that an appropriate countermeasure is taken in a case where the noise is detected.

FIG. 7 is a drawing for showing a noise detection technique according to Embodiment 1 of the invention. The reference combustion waveform that is illustrated in FIG. 7 is a schematic illustration of a waveform of reference data of the MFB based on the engine operating condition. Actually Measured Combustion Waveform 1 and Actually Measured Combustion Waveform 2 that are illustrated in the drawing are examples of schematic illustrations of the waveform of the actually measured data of the MFB. More specifically, Actually Measured Combustion Waveform 1 shows an example in which the noise is not superimposed, and Actually Measured Combustion Waveform 2 shows an example in which the spike-shaped noise is superimposed in the crank angle period preceding the combustion period (CA0-CA100).

In this embodiment, a "correlation index value $I_R$" that shows a degree of a correlation between the reference data and the actually measured data of the MFB is obtained so that the noise which is superimposed on the actually measured data of the MFB is detected. In this embodiment, a cross-correlation function is used as a technique that is preferable for the calculation of the correlation index value $I_R$. The calculation of a cross-correlation coefficient R in which the cross-correlation function is used is performed by the use of the following Equation (4).

$$R = \Sigma f_{a \sim b}(\theta) g_{a \sim b}(\tau_\theta - \theta) \quad (4)$$

In Equation (4) above, $\theta$ represents the crank angle. $\tau_\theta$ is a variable representing a relative deviation in a crank angle axis direction with regard to two waveforms as evaluation targets regarding the degree of the correlation (in this embodiment, the waveforms of the reference data and the actually measured data of the MFB). Function $f_{a \sim b}(\theta)$ is equivalent to the reference data of the MFB as a set of discrete values present for respective predetermined crank angles. Likewise, function $g_{a \sim b}(\tau_\theta - \theta)$ is equivalent to the actually measured data of the MFB as a set of discrete values. More specifically, (a~b) represent sections on a crank angle axis in which these functions $f_{a \sim b}(\theta)$ and $g_{a \sim b}(\tau_e - \theta)$ are defined, respectively. The sections (a~b) are equivalent to the crank angle period (hereinafter, referred to as a "calculation period $\alpha$") where the reference data and the actually measured data as the targets of the calculation of the cross-correlation coefficient R (that is, the evaluation targets regarding the degree of the correlation) are present among the reference data and the actually measured data of the MFB. In this embodiment, the calculation period α is from the ignition timing to the opening timing (EVO) of the exhaust valve 22. In a case where the actually measured value of the specific ratio combustion point CAα used in the engine control (CA10 and CA50 in this embodiment) is not included in the actually measured data of the MFB calculated based on the actually measured data of the in-cylinder pressure, the actually measured value may be obtained by interpolation of the nearby actually measured data, a value on the reference data side that forms a pair therewith may also be obtained, and then the pair of these values may be included in the evaluation target regarding the degree of the correlation.

To perform a convolution operation by the use of Equation (4) is to perform an operation for continuously calculating the cross-correlation coefficient R while the entire waveform of the actually measured data of the MFB in the calculation period (α) is moved little by little in the direction of the crank angle (horizontal axis direction of the combustion waveform illustrated in FIG. 7) with the waveform of the reference data fixed by the variable $\tau_\theta$ being changed within a predetermined range. A maximum value $R_{max}$ of the cross-correlation coefficient R in this calculation process corresponds to the cross-correlation coefficient R pertaining to a case where the two waveforms are the closest to each other in general, and can be represented as in the following Equation (5). The correlation index value $I_R$ that is used in this embodiment is a value which is obtained by a predetermined normalization processing being performed on not the maximum value $R_{max}$ itself but the cross-correlation coefficient R. This normalization processing is a processing that is defined so that the $R_{max}$ available when the two waveforms (waveforms of the reference data and the actually measured data) completely correspond to each other shows 1. The processing itself is known, and thus detailed description thereof will be omitted herein.

$$R_{max}=\max(R)=\max(\Sigma f_{a-b}(\theta)g_{a-b}(\tau_\theta-\theta)) \quad (5)$$

The correlation index value $I_R$ that is calculated through the above-described calculation processing reaches 1 (maximum) in a case where the two waveforms completely correspond to each other and approaches 0 when the degree of the correlation between the two waveforms decreases. In a case where the correlation index value $I_R$ shows a negative value, the two waveforms have a negative correlation. The correlation index value $I_R$ shows −1 in a case where the two waveforms are completely reversed. Accordingly, the degree of the correlation between the reference data and the actually measured data of the MFB can be grasped based on the correlation index value $I_R$ obtained as described above. The use of the cross-correlation function in this embodiment is to compare the actually measured data to the reference data (that is, ideal MFB data) by the use of the same type of data that is the MFB data as a target. Accordingly, it is conceivable that the cross-correlation function that is used herein can be said to be an autocorrelation function in substance.

In the example that is illustrated in FIG. 7, the correlation index value $I_R$ has a high value (value close to 1) in the case of Actually Measured Combustion Waveform 1 with no noise superimposition. In the case of Actually Measured Combustion Waveform 2, which is subjected to a sporadic superimposition of the spike-shaped noise, the correlation index value $I_R$ has a value that is lower than that pertaining to the case of Actually Measured Combustion Waveform 1. A decrease in the value of the correlation index value $I_R$ due to the noise superimposition is not limited to the case of the sporadic superimposition of the spike-shaped noise but also occurs even in a case where the noise is continuously superimposed as in Noise Waveform 3 in FIG. 6. The correlation index value $I_R$ decreases as the superimposed noise reaches a higher level. Accordingly, when a determination value $I_{Rth}$ (positive value) is set in advance, it can be determined whether or not the noise exceeding a certain level is superimposed on the actually measured data of the MFB based on a magnitude of the correlation index value $I_R$.

(Countermeasure During Noise Detection)

A feedback control of high accuracy might be impossible when the SA-CA10 feedback control and the CA50 feedback control continue as they are despite a situation in which the noise is superimposed on the actually measured data of the MFB. In this regard, in this embodiment, it is determined whether or not the noise is superimposed on the actually measured data of the MFB based on whether or not the correlation index value $I_R$ calculated for each combustion cycle is lower than the determination value $I_{Rth}^-$.

In a case where a positive result is yielded as a result of the above-described determination, the actually measured CA10 and the actually measured CA50 pertaining to the combustion cycle in which the correlation index value $I_R$ as the target of the positive determination is calculated are prohibited from being reflected in the SA-CA10 feedback control and the CA50 feedback control, respectively.

In this embodiment, the maximum value of the value that is obtained by the normalization of the cross-correlation coefficient R is used as the correlation index value $I_R$ as described above. However, the "correlation index value" according to the invention may be the maximum value $R_{max}$ of the cross-correlation coefficient R itself not subjected to any predetermined normalization processing. The correlation index value undergoing no normalization processing (that is, the maximum value $R_{max}$), however, does not simply increase as the degree of the correlation increases, and the size of the maximum value $R_{max}$ and the size of the degree of the correlation have the following relationship, that is, the degree of the correlation increases as a result of an increase in the maximum value $R_{max}$, and the degree of the correlation reaches its maximum when the maximum value $R_{max}$ reaches a certain value X (that is, the two waveforms completely correspond to each other). Then, when the maximum value $R_{max}$ exceeds the value X, the degree of the correlation decreases as a result of an increase in the maximum value $R_{max}$. Accordingly, in a case where the maximum value $R_{max}$ undergoing no normalization processing itself is used as the "correlation index value", a determination of whether or not the "correlation index value" is lower than the "determination value" can be performed through the following processing, that is, it can be determined that the "correlation index value is lower than the determination value" in a case where the maximum value $R_{max}$ is out of a predetermined range centered around the value X, and it can be determined that the "correlation index value is equal to or higher than the determination value" in a case where the maximum value $R_{max}$ falls within the predetermined range.

(Specific Processing According to Embodiment 1)

Figure 8:
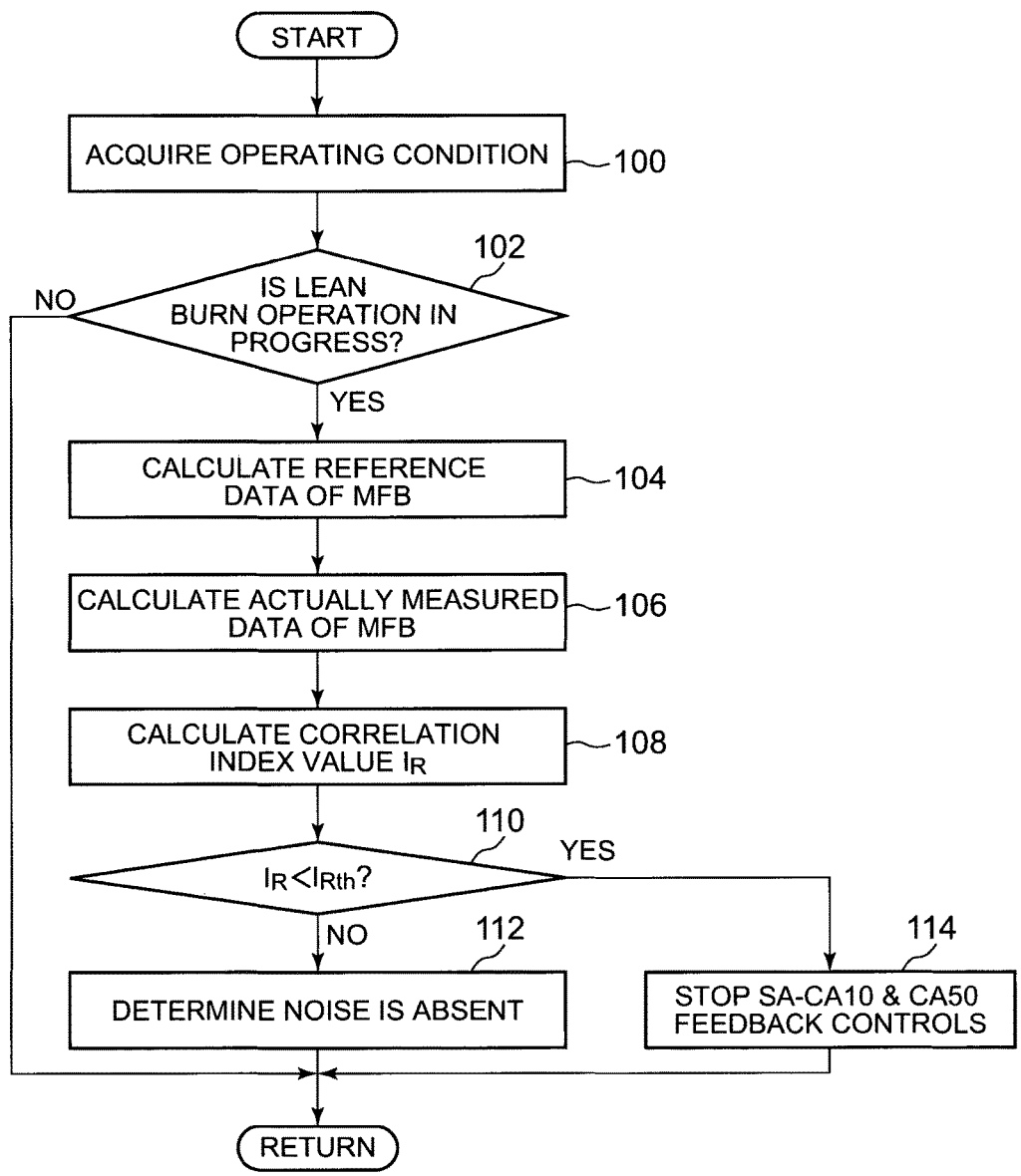
FIG. 8 is a flowchart of a routine that is executed according to Embodiment 1 of the invention.

FIG. 8 is a flowchart illustrating a routine that is executed by the ECU 40 according to Embodiment 1 of the invention. This routine starts at a timing following the opening timing of the exhaust valve 22 in each cylinder and is repeatedly executed for each combustion cycle.

In Step 100, the first step of the routine that is illustrated in FIG. 8, the ECU 40 acquires the current engine operating conditions. These engine operating conditions mainly refer to the engine rotation speed, the suctioned air amount, the air-fuel ratio, and the ignition timing. The engine rotation speed is calculated by the use of the crank angle sensor 42. The suctioned air amount is calculated by the use of the air flow meter 44. The air-fuel ratio is the target air-fuel ratio and can be calculated with reference to a map in which the target air-fuel ratio is determined in a relationship between an engine torque and the engine rotation speed. The target air-fuel ratio is either a predetermined lean air-fuel ratio that is used during the lean burn operation or the theoretical air-fuel ratio. The ignition timing is an indication value of the ignition timing used in the present combustion cycle (that is, the target ignition timing). The target ignition timing is determined by the suctioned air amount and the engine rotation speed as main parameters in the event of an operation at the theoretical air-fuel ratio, and a value reflecting the CA50 feedback control is used as the target ignition timing in the event of the lean burn operation. A target torque that is calculated based on an accelerator opening degree which is detected by an accelerator position sensor (not illustrated) of the vehicle or the like can be used as the engine torque.

Then, the ECU 40 proceeds to Step 102 and determines whether or not a current operation region is a lean burn operation region. Specifically, the ECU 40 determines whether the current operation region is the lean burn operation region or an operation region using the theoretical air-fuel ratio based on the target air-fuel ratio acquired in Step 100.

In a case where the determination of Step 102 is not satisfied, the processing of the present routine is immediately terminated. In a case where the determination of Step 102 is satisfied, the ECU 40 proceeds to Step 104. In Step 104, the reference data of the MFB is calculated based on the engine operating conditions acquired in Step 100. The reference data of the MFB can be calculated in accordance with, for example, the following Equation (6). The calculation of the MFB data using Equation (6) is known as a calculation using the Wiebe function, and thus detailed description thereof will be omitted herein. As described above, in this embodiment, the calculation period α for the calculation of the correlation index value $I_R$ is the crank angle period from the ignition timing (target ignition timing) SA to the opening timing EVO of the exhaust valve 22. In this Step 104, the reference data of the MFB is calculated by the use of Equation (6) with the calculation period α used as a target.

$$-MFB = \left[1 - \exp\left\{-c\left(\frac{\theta - \theta_{min}}{\theta_{max} - \theta_{min}}\right)^{m+1}\right\}\right] \quad (6)$$

In Equation (6), c is a constant determined in advance. m is a shape parameter, which can be obtained with reference to a map in which the shape parameter m is determined in advance in a relationship with the engine operating conditions (more specifically, the engine rotation speed, the suctioned air amount, the air-fuel ratio, and the ignition timing acquired in Step 100).

Then, the ECU 40 proceeds to Step 106. In Step 106, the actually measured data of the MFB is calculated in accordance with Equation (3) above based on the actually measured data of the in-cylinder pressure acquired by the use of the in-cylinder pressure sensor 30 in the present combustion cycle.

Then, the ECU 40 proceeds to Step 108. In Step 108, the correlation index value $I_R$ is calculated in accordance with Equation (4) above, with the calculation period α used as a target, and by the use of the reference data and the actually measured data of the MFB calculated in Steps 104 and 106, respectively.

Then, the ECU 40 proceeds to Step 110. In Step 110, it is determined whether or not the correlation index value $I_R$ that is calculated in Step 108 is lower than the predetermined determination value $I_{Rth}$. The determination value $I_{Rth}$ that is used in this Step 110 is set in advance as a value with which it can be determined that the noise of at least a certain level is superimposed.

In a case where the determination of Step 110 is not satisfied ($I_R \geq I_{Rth}$), that is, in a case where it can be determined that the actually measured data of the MFB in the present combustion cycle has a high degree of correlation with the reference data in the same operating conditions, the ECU 40 proceeds to Step 112 and determines that the noise of at least the certain level is not superimposed.

In a case where the determination of Step 110 is satisfied ($I_R < I_{Rth}$), that is, in a case where it can be determined that the actually measured data of the MFB has a low degree of correlation with the reference data, the ECU 40 proceeds to Step 114. In this case, it can be determined that the noise of at least the certain level is superimposed. Accordingly, in Step 114, the SA-CA10 feedback control and the CA50 feedback control are stopped.

As described above, the SA-CA10 feedback control and the CA50 feedback control are executed for each cylinder during the lean burn operation, and results of these feedback controls (that is, the correction amounts based on the feedback controls) are reflected in the subsequent combustion cycle of the same cylinder. More specifically, the processing of this Step 114 is to stop these feedback controls by maintaining each of the correction amount of the fuel injection quantity based on the SA-CA10 feedback control and the correction amount of the ignition timing based on the CA50 feedback control at a previous value (more specifically, a value calculated in the previous combustion cycle) and preventing the actually measured CA10 and the actually measured CA50 calculated in the present combustion cycle from being reflected in the respective correction amounts. An example of the above-described feedback control that is performed with reference to FIG. 3 uses the PI control. In other words, these feedback controls include an I term (integral term) using a cumulative difference between the target value (such as the target SA-CA10) and the actually measured value (such as the actually measured SA-CA10). Accordingly, in a case where the above-described difference in the past combustion cycle is used for the calculation of the I term when the feedback control is resumed, it is desirable that the value of the combustion cycle in which the noise is detected is not included.

According to the above-described processing of the routine that is illustrated in FIG. 8, the noise superimposed on the actually measured data can be detected based on the correlation index value $I_R$ calculated with the reference data and the actually measured data of the MFB in the same operating conditions used as the target. Then, in a case where the noise is detected, the feedback controls using the actually measured data of the MFB (that is, the SA-CA10 feedback control and the CA50 feedback control) are stopped. Then, the actually measured CA10 or the actually measured CA50 of the present combustion cycle that might be subjected to the error attributable to the noise are prohibited from being reflected in the respective feedback controls. Accordingly, a reduction in the accuracy of the engine control due to the use of the actually measured CA10 or the actually measured CA50 can be avoided.

(Advantage of Cross-Correlation Function)

In Embodiment 1 described above, the cross-correlation function is used for the calculation of the correlation index value $I_R$ that shows the degree of the correlation between the actually measured data and the reference data of the MFB. However, the technique for calculating the "correlation index value" according to the invention is not necessarily limited to the use of the cross-correlation function. For example, the calculation technique may be a value obtained by summing a square of the difference between the actually measured data and the reference data of the MFB at the same crank angle (so-called residual sum of squares) with a predetermined calculation period used as a target. In the case of the residual sum of squares, the value decreases as the degree of the correlation increases. The "correlation index value" according to the invention is, more specifically, is a value that increases as the degree of the correlation increases. Accordingly, in a case where the residual sum of squares is used, a reciprocal number of the residual sum of squares may be used as the "correlation index value".

It can be said that the use of the cross-correlation function is better than the residual sum of squares because of the following reasons. In the waveform of the actually measured data of the MFB, a deviation with respect to the waveform of the reference data attributable to a combustion variation might occur between the combustion cycles regardless of the presence or absence of the noise superimposition. According to the residual sum of squares, a value of a certain size is calculated even in a case where a deviation of the waveform of the actually measured data not attributable to the noise occurs. In other words, the residual sum of squares reacts sensitively to the deviation of the actually measured data attributable to the combustion variation. Accordingly, it can be said that it is difficult to accurately detect the noise by distinguishing the noise from the combustion variation except for a case where a relatively high level of noise is uniformly superimposed on the entire actually measured data as in Noise Waveform 3 in FIG. 6. According to the residual sum of squares of this nature, it can be said that it is difficult to detect the noise by distinguishing the noise from the combustion variation especially in a case where the spike-shaped noise is sporadically superimposed as in Noise Waveform 1 or 2 in FIG. 6.

As described above, the calculation of the cross-correlation function includes the operation for continuously calculating the cross-correlation coefficient R while the entire waveform of the actually measured data of the MFB in the calculation period α is moved little by little in the direction of the crank angle (horizontal axis direction of the combustion waveform illustrated in FIG. 7) with the waveform of the reference data fixed. Herein, the maximum value of the value following the normalization of the cross-correlation coefficient R obtained in this calculation process is the correlation index value $I_R$ pertaining to the combustion cycle as a calculation target. Accordingly, although the shape of the MFB data itself is identical to that of the reference data, the correlation index value $I_R$ is calculated in a state where the actually measured data is moved to be substantially correlated with the reference data according to the cross-correlation function even in a case where the actually measured data slightly deviates from the reference data in the crank angle direction due to the combustion variation. Accordingly, the use of the cross-correlation function compared to the use of the residual sum of squares can be said to allow the noise to be detected with a higher level of accuracy and it can be said that the noise detectability increases especially in the case of the sporadic superimposition of the spike-shaped noise. Accordingly, it can be said that the use of the cross-correlation function is a technique allowing the noise detection to become more accurate than the use of the residual sum of squares regardless of the type of the noise.

In Embodiment 1 described above, the "combustion mass ratio calculation means" according to the invention is realized by the ECU 40 executing the processing of Step 106, the "control means" according to the invention is realized by the ECU 40 executing the SA-CA10 feedback control and the CA50 feedback control and executing the processing of Step 114 in the case of the satisfaction of the determination of Step 110, and the "correlation index value calculation means" according to the invention is realized by the ECU 40 executing the processing of Step 108. In addition, the fuel injection valve 26 and the ignition device 28 correspond to the "actuators" according to the invention.

Embodiment 2

Hereinafter, Embodiment 2 of the invention will be described with reference to FIGS. 9 to 12.

[Noise Detection Technique and Countermeasure During Noise Detection According to Embodiment 2]

Embodiment 2 is basically similar to Embodiment 1 in that the degree of the correlation between the actually measured data and the reference data of the MFB is evaluated by the use of the cross-correlation function for noise detection with the internal combustion engine 10 having the hardware configuration illustrated in FIG. 1 used as a target and in that the feedback control using the specific ratio combustion point CAα is stopped when the noise is detected.

(Necessity of Distinction Between Noise with Control Effect and Noise without Control Effect)

Figure 9:
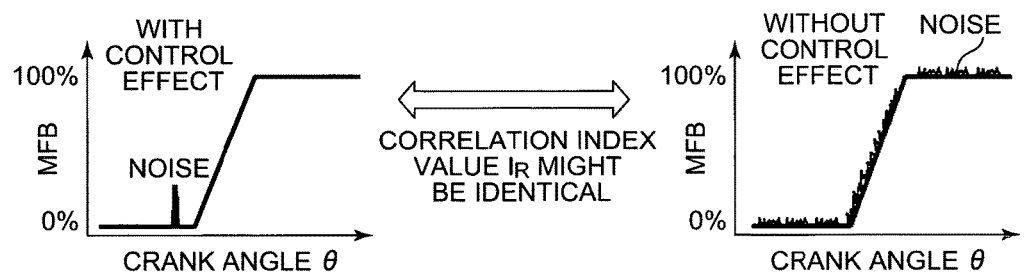
FIG. 9 is a diagram for showing problems of the noise detection technique according to Embodiment 1 of the invention and a countermeasure taken when the noise is detected.

FIG. 9 is a drawing for showing problems regarding the noise detection technique and the countermeasure during the noise detection according to Embodiment 1 described above. The calculation period α that is used in the evaluation of the degree of the correlation of the MFB data according to Embodiment 1 is from the ignition timing to the opening timing of the exhaust valve 22. In other words, in Embodiment 1, the single calculation period α collectively refers to the wide range of the combustion period and the crank angle period preceding or following the combustion period and the actually measured data of the MFB is evaluated at a time. However, the use of this technique causes the following problems.

That is, the drawing on the left side in FIG. 9 is a schematic illustration of the waveform of the actually measured data of the MFB on which a relatively high level of spike-shaped noise is sporadically superimposed on the crank angle period preceding the combustion period. When this noise is superimposed, the feedback control based on the specific ratio combustion point CAα is affected. The drawing on the right side in FIG. 9 is a schematic illustration of the waveform of the actually measured data of the MFB on which a fine noise is uniformly superimposed over a wide range. It can be said that the level of this noise does not affect the above-described feedback control. It can be said that these two actually measured data of the MFB significantly differ from each other in terms of the degree of effect on the feedback control. In a case where the cross-correlation function is used with the target of the wide-range calculation period α as in Embodiment 1, however, the correlation index values $I_R$ regarding these respective actually measured data might become values which are very similar to each other. In other words, when the calculation is performed with the wide-range calculation period α en bloc, the noise detection is performed with the noise with the control effect and the noise without the control effect not distinguished from each other in some cases. As a result, when the noise that does not have to consider the control effect is detected, the feedback control might be stopped, which constitutes an unnecessary control change. Accordingly, it is desirable that the noise with the control effect and the noise without the control effect are more appropriately distinguished from each other so that the occurrence of the unnecessary control change is suppressed.

(Necessity of Dividing Calculation Period to Avoid Unnecessary Control Change)

In addition, a case where the noise is superimposed in the crank angle period preceding the combustion period and a case where the noise is superimposed in the crank angle period following the combustion period as in Noise Waveform 1 and Noise Waveform 2 in FIG. 6 described above are conceivable as situations in which the spike-shaped noise with the control effect is sporadically superimposed. As described above with reference to FIG. 6 in the description of Embodiment 1, the specific ratio combustion point CAα that is affected by the noise varies depending on the difference in the crank angle timing of the superimposition of the spike-shaped noise. However, when the evaluation of the MFB data is performed with the wide-range calculation period α en bloc as in Embodiment 1, the noise detection is performed without the difference in the crank angle timing at which the spike-shaped noise is actually superimposed being taken into account. When both the feedback controls of the SA-CA10 feedback control and the CA50 feedback control are stopped in the event of the noise detection as in Embodiment 1, not only the SA-CA10 feedback control using the CA10 in which the noise-based error is likely to occur but also the feedback control on the CA50 side which is unlikely to be affected by the noise are stopped in the case of, for example, Noise Waveform 1. Accordingly, it can be said that the unnecessary control change occurs.

(Noise Detection Technique and Countermeasure During Noise Detection According to Embodiment 2)

Figure 10:
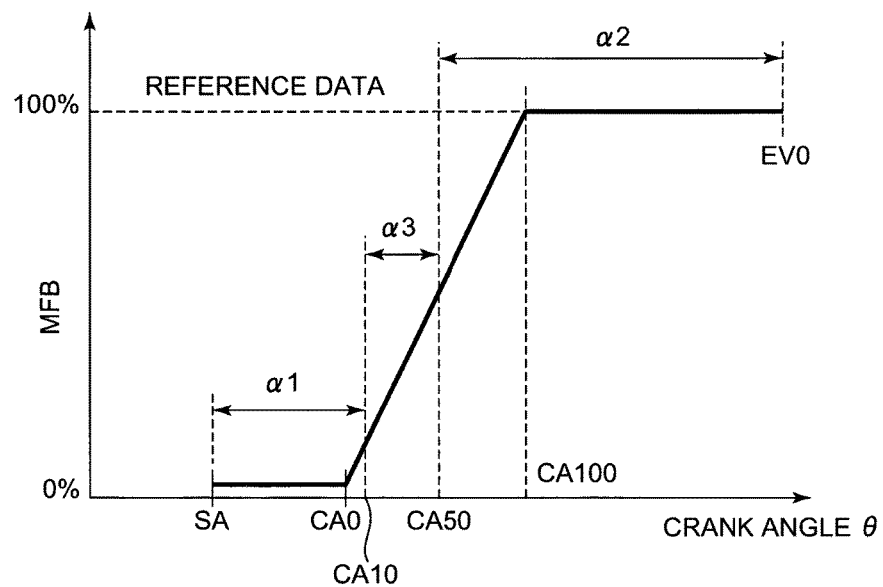
FIG. 10 is a diagram illustrating each crank angle period of MFB data defined in Embodiment 2 of the invention.

In this embodiment, the calculation period as the calculation target of the cross-correlation coefficient is set as follows, and FIG. 10 is a drawing illustrating each of the crank angle periods of the MFB data defined according to Embodiment 2 of the invention. In this embodiment, as illustrated in FIG. 10, the crank angle period to which each MFB data belongs is divided into the three periods of an early period α1, a middle period α3, and a late period α2 by the use of the "reference data" of the MFB. More specifically, this embodiment is similar to Embodiment 1 in that the period in which the actually measured data of the MFB is acquired is, for example, from the ignition timing SA to the opening timing EVO of the exhaust valve 22 while the early period α1 is the crank angle period targeting the data from the ignition timing SA to the CA10 (including the CA10), the middle period α3 is the crank angle period targeting the data from the CA10 to the CA50 (including the CA50), and the late period α2 is the crank angle period targeting the data from the CA50 to the EVO. The reference data, the CA10, and the CA50 that are used for the identification of these three periods (α1, α2, α3) can change as the reference data changes depending on the engine operating conditions as described in Embodiment 1. Accordingly, the three periods (α1, α2, α3) also change depending on the engine operating conditions.

In this embodiment, correlation index values $I_{R1}$, $I_{R2}$ are calculated with the early period α1 and the late period α2 used as respective targets and without the middle period α3 being used among the three periods (α1, α2, α3) described above. The middle period α3 that is excluded from the calculation targets of the correlation index values $I_{R1}$, $I_{R2}$ as described above includes at least a pair of data relating to the actually measured data and the reference data of the MFB.

The actually measured data of the MFB of the late period α2 is evaluated prior to that of the early period α1. Then, in a case where the correlation index value $I_{R2}$ relating to the late period α2 is lower than a determination value $I_{R2th}$ (that is, in a case where the actually measured data and the reference data have a low degree of correlation), it is determined that the noise is superimposed on the late period α2 (more specifically, at least the late period α2). In this case, both the SA-CA10 feedback control and the CA50 feedback control are stopped. Even in a case where the degree of the correlation of the MFB data in the late period α2 is high, it is determined that the noise is superimposed on the early period α1 in a case where the correlation index value $I_{R1}$ relating to the early period α1 is lower than a determination value $I_{R1th}$ (that is, in a case where the actually measured data and the reference data have a low degree of correlation). In this case, the SA-CA10 feedback control is stopped.

(How to Determine Calculation Period Targeting Calculation of Cross-Correlation Coefficient)

Figure 11:
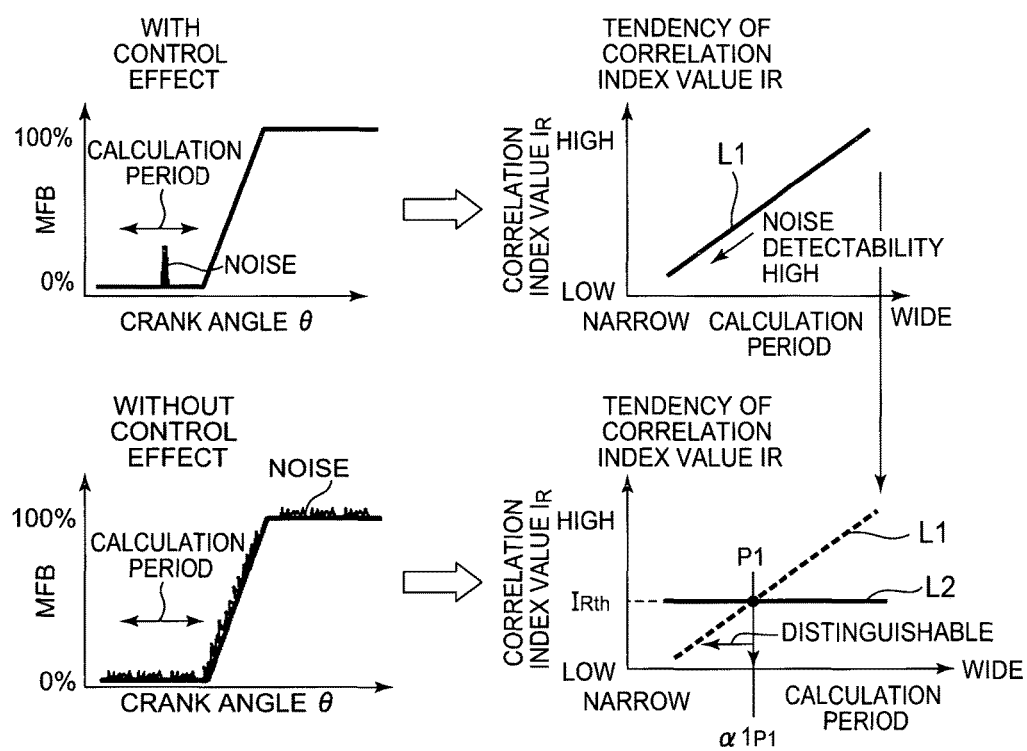
FIG. 11 is a diagram for showing a calculation period determination technique that is preferable for addressing the problem which is illustrated in FIG. 9.

FIG. 11 is a diagram for showing a technique for determining the calculation period preferable for addressing the problem illustrated in FIG. 9. Herein, the calculation period determination technique will be described with the early period α1 used as an example. However, the description is applicable to the late period α2 as well.

The drawing on the upper side in FIG. 11 is a schematic illustration of the waveform of the MFB data on which the spike-shaped noise is sporadically superimposed with a magnitude at a level at which the control effect begins to appear. Herein, to narrow the calculation period (the early period α1 in this example) means an increase in a degree of contribution of each data in the early period α1 to the calculation of the correlation index value $I_{R1}$. More specifically, because narrowing the calculation period α1 is to reduce the number of data of the calculation target, narrowing the calculation period α1 causes an increase in a ratio of the number of noise data to the total number of the calculation target data (that is, the effect that the noise data has on the calculation of the correlation index value $I_{R1}$ increases) in a case where the data on which the sporadic noise is superimposed is assumed. Accordingly, the noise detectability can be raised by the narrowing of the calculation period α1.

In the case of the drawing on the upper side in FIG. 11, the correlation index value $I_{R1}$ decreases as the calculation period α1 is narrowed as illustrated by the straight line L1 in FIG. 11. The drawing on the lower side in FIG. 11 is a schematic illustration of the waveform of the MFB data on which the maximum noise is comprehensively and uniformly superimposed within a level that can be said to lack the control effect. In the case of this uniform noise superimposition, it can be said that the ratio between the numbers of the noise data and the no-noise data in the actually measured data rarely changes even when the calculation period α1 is narrowed. Accordingly, it can be said that the correlation index value $I_{R1}$ pertaining to this case schematically shows a constant value (referred to "$I_{R1th}$" herein) as illustrated by the straight line L2 in FIG. 11. The point P1 in FIG. 11 is a point of intersection of the straight line L1 and the straight line L2. When the calculation period α1 is more narrowed than this point of intersection P1, the value of the correlation index value $I_{R1}$ pertaining to the case of the superimposition of the spike-shaped noise becomes lower than the value $I_{R1th}$ of the correlation index value $I_{R1}$ pertaining to the case of the uniform noise superimposition. Accordingly, when the calculation period α1 is set to be narrower than the calculation period $α1_{P1}$ at the point of intersection P1, the effect of the noise with the control effect on the value of the correlation index value $I_{R1}$ can become relatively larger. Accordingly, the noise with the control effect and the noise without the control effect can be distinguished from each other by the determination value $I_{R1th}$ being employed as the determination value. The early period α1 as the period from the ignition timing SA to the CA10 according to this embodiment is set in accordance with the above-described determination method.

Unlike in the case of the sporadic superimposition of the spike-shaped noise described with reference to FIG. 11, it can be said that the case of the uniform superimposition of the noise with the control effect at the similar level over the entire actually measured data of the MFB as in Noise Waveform 3 in FIG. 6 described above is free from the problem relating to the distinction between the noise with the control effect and the noise without the control effect in the first place. This is because, in the case of the uniform noise superimposition, the correlation index value $I_R$ can be said to be rarely affected by the length of the calculation period as in the case of the drawing on the lower side in FIG. 11 and the value of the correlation index value $I_R$ is higher in a case where the noise with the control effect is superimposed than in a case where the noise without the control effect is superimposed.

(Determination of Variation Factor of CA50)

The specific ratio combustion point CAα that is calculated based on the actually measured data of the MFB varies between the combustion cycles due to the combustion variation under the same operating conditions in addition to the effect of the noise. As described above with regard to Embodiment 1, the CA50 on the central side of the combustion period is a combustion point at which the error based on the effect of the noise is unlikely to occur. Accordingly, in a case where the CA50 of the actually measured data varies despite a situation in which it can be determined that the noise is not superimposed on the actually measured data of the MFB of the late period α2, it can be said that the variation of the CA50 is due to the combustion variation. In addition, the calculation technique with which it can be appropriately determined whether or not the noise is superimposed on the actually measured data of the MFB of the late period α2 with the effect of the combustion variation minimized even in the situation in which the combustion variation occurs is the cross-correlation function used in this embodiment.

More specifically, when the cross-correlation function is used in the evaluation of the degree of the correlation of the MFB data relating to the late period α2, a cross-correlation coefficient R2 is continuously calculated while the entire waveform of the actually measured data of the MFB in the late period α2 is moved little by little in the crank angle direction with the waveform of the reference data fixed. As a result of this calculation, the correlation index value $I_{R2}$ that is the maximum value of the value following the normalization of the cross-correlation coefficient R2 is calculated in a state where the overall actually measured data is the closest to the reference data to the maximum extent possible even when the actually measured data of the late period α2 deviates from the reference data due to the combustion variation. Accordingly, when the cross-correlation function is used, the noise detection relating to the late period α2 is performed with the effect of the combustion variation minimized.

In this embodiment, it is determined that the variation factor of the CA50 is not the noise but the combustion variation in a case where the CA50 has a high level of variation in a situation in which the correlation index value $I_{R2}$ of the late period α2 is lower than the determination value $I_{R2th}$.

(Specific Processing According to Embodiment 2)

Figure 12:
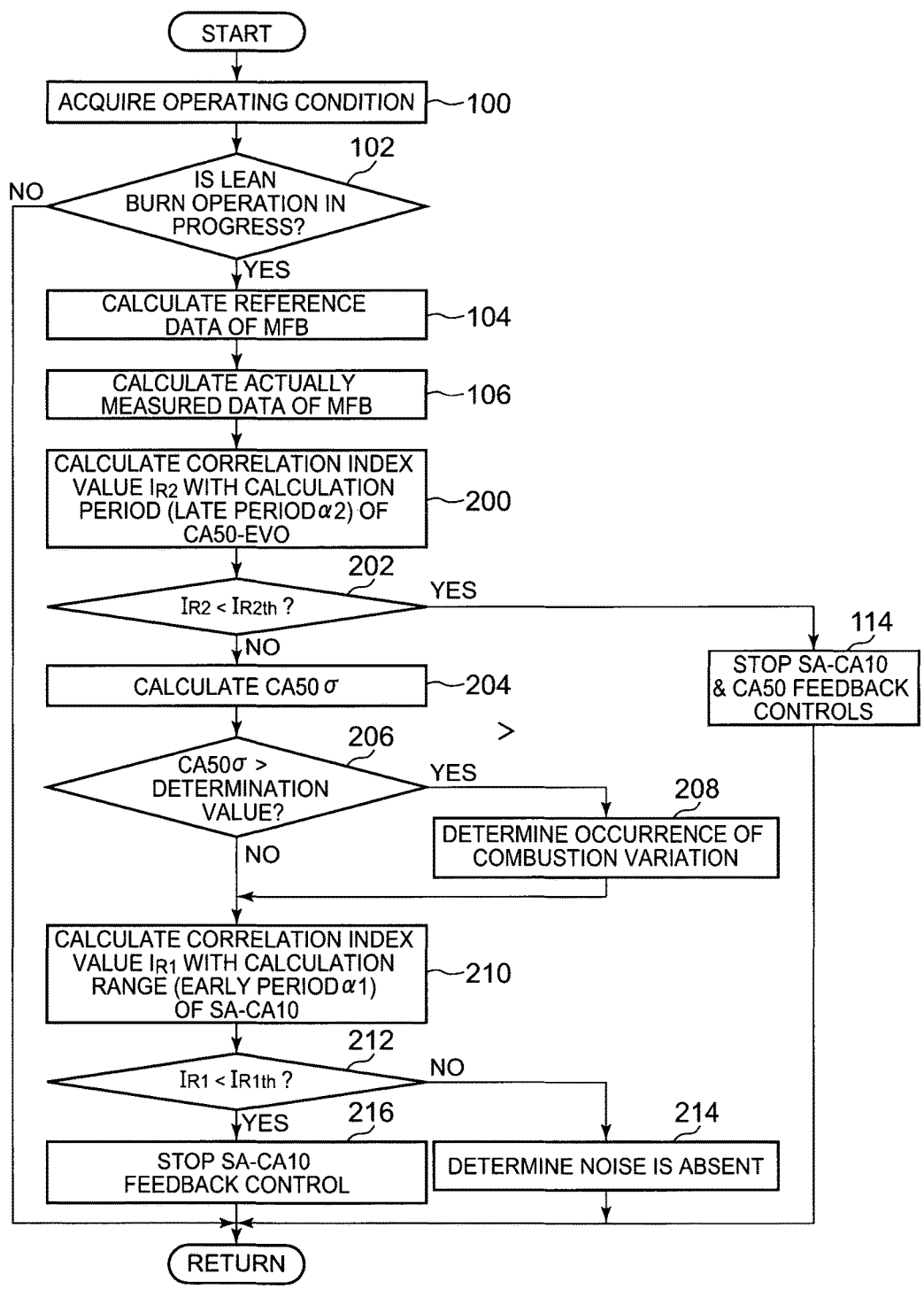
FIG. 12 is a flowchart of a routine that is executed according to Embodiment 2 of the invention.

FIG. 12 is a flowchart illustrating a routine that is executed by the ECU 40 according to Embodiment 2 of the invention. The steps according to Embodiment 2 in FIG. 12 that are identical to those according to Embodiment 1 illustrated in FIG. 8 share the same reference numerals as those in FIG. 8, and description thereof will be omitted.

In the routine that is illustrated in FIG. 12, the ECU 40 proceeds to Step 200 after calculating the actually measured data of the MFB in Step 106. In Step 200, the ECU 40 calculates the correlation index value $I_{R2}$ by the use of Equation (4) above, targeting the data in the late period α2 among the reference data and the actually measured data of the MFB respectively calculated in Steps 104 and 106.

Then, the ECU 40 proceeds to Step 202. In Step 202, it is determined whether or not the correlation index value $I_{R2}$ calculated in Step 200 in relation to the late period α2 is lower than the determination value $I_{R2th}$. The determination value $I_{R2th}$ is a value that is determined in advance based on the same idea as the determination value $I_{R1th}$ described with reference to FIG. 11 for the determination of the late period α2.

In a case where the determination of Step 202 is satisfied ($I_{R2}<I_{R2th}$), the actually measured data of the MFB of the late period α2 has a low degree of correlation with the reference data, and thus it can be determined that the noise with the control effect is superimposed on the actually measured data of the late period α2. Accordingly, in this case, the ECU 40 proceeds to Step 114 and stops the SA-CA10 feedback control and the CA50 feedback control.

The ECU 40 proceeds to Step 204 in a case where the determination of Step 202 is not satisfied ($I_{R2} \geq I_{R2th}$), that is, in a case where it can be determined that the actually measured data of the MFB of the late period α2 has a high degree of correlation with the reference data. In Step 204, a CA50σ that is a variation index value which shows a variation degree of the CA50 is calculated. The CA50σ is a standard deviation σ of the actually measured CA50 pertaining to a predetermined past combustion cycle including the actually measured CA50 of the present combustion cycle.

Then, the ECU 40 proceeds to Step 206. In Step 206, it is determined whether or not the CA50σ calculated in Step 204 exceeds a predetermined determination value. A case where the determination of Step 206 is satisfied refers to a case where determination of Step 202 is not satisfied and the CA50σ is at a high level despite a situation in which it can be said that the degree of the correlation of the MFB data of the late period α2 is high. In this case, it can be said that the variation of the CA50 is because of the combustion variation as described above. Accordingly, the ECU 40 proceeds to Step 208 and it is determined that the variation of the CA50 is not because of the noise but because of the combustion variation.

The ECU 40 proceeds to Step 210 after the execution of the processing of Step 208 or in a case where the determination of Step 206 is not satisfied. In Step 210, the ECU 40 calculates the correlation index value $I_{R1}$ by the use of Equation (4) above, targeting the data in the early period α1 among the reference data and the actually measured data of the MFB respectively calculated in Steps 104 and 106.

Then, the ECU 40 proceeds to Step 212. In Step 212, it is determined whether or not the correlation index value $I_{R1}$ that is calculated in Step 210 in relation to the early period α1 is lower than the above-described determination value $I_{R1th}$. The ECU 40 proceeds to Step 214 in a case where this determination is not satisfied ($I_{R1} \geq I_{R1th}$), that is, in a case where it can be determined that the actually measured data of the MFB of the early period α1 has a high degree of correlation with the reference data. In Step 214, it is determined that the noise at a level affecting the control is not superimposed on the late period α2 and the early period α1 alike.

In a case where the determination of Step 212 is satisfied ($I_{R1} < I_{R1th}$), it can be determined that the actually measured data of the MFB of the early period α1 has a low degree of correlation with the reference data. This determination of Step 212 is satisfied when the determination of Step 202 is not satisfied. Accordingly, in this case, it can be determined that the noise with the control effect is superimposed on the actually measured data of the early period α1 while the noise with the control effect is not superimposed on the actually measured data of the late period α2. Accordingly, the ECU 40 proceeds to Step 216 and stops only the SA-CA10 feedback control.

According to the above-described processing of the routine that is illustrated in FIG. 12, the correlation index values $I_{R1}$, $I_{R2}$ are calculated with the early period α1 and the late period α2 of the actually measured data and the reference data of the MFB used as respective targets. In other words, the degree of the correlation of the MFB data is individually evaluated with the early period α1 and the late period α2 used as the targets instead of the entire MFB data being used en bloc. When the calculation period is narrowed as described above, the noise detectability can be raised for the reason described above with reference to FIG. 11. Accordingly, the noise with the control effect and the noise without the control effect can be more accurately distinguished from each other. As a result, the unnecessary control change resulting from the detection of the noise without the control effect can be suppressed.

In addition, the exclusion of the middle period α3 from the calculation target of the correlation index value $I_{R1}$ or $I_{R2}$ results in the improvement of the detectability as well. This is because the exclusion of the middle period α3 allows one or both of the early period α1 and the late period α2 to be shortened (that is, because the exclusion contributes to a reduction in the number of data of the calculation target of one or both of the correlation index values $I_{R1}$, $I_{R2}$). The middle period α3 is the crank angle period in the combustion period when the MFB linearly increases at a high rate of change. Accordingly, in the middle period α3, the variation of the calculation of the specific ratio combustion point CAα attributable to the effect of the noise is unlikely to occur (that is, the calculated value of the CAα is unlikely to be subjected to the noise-based error) even when the noise is superimposed. Accordingly, it can be said that no particular problem arises regarding the detection of the noise with the control effect even when the middle period α3 is excluded.

In addition, in a case where the superimposition of the spike-shaped noise is assumed, the CA10 and the CA50 have different noise-based effects due to the difference in the crank angle timing of the noise superimposition as described above. When the calculation period is divided into the early period α1 and the late period α2 through the processing of the above-described routine, an appropriate noise countermeasure (control change) in accordance with the crank angle timing of the noise superimposition is performed. More specifically, in a case where the noise is superimposed on the late period α2, the error is likely to occur at not only the CA50 on the central side of the combustion period but also the CA10 in the early stage of combustion. Accordingly, in this case, it is reasonable to change the content of both feedback controls for noise countermeasure. In a case where the noise is superimposed on the early period α1 and the noise is not superimposed on the late period α2, the error is unlikely to occur at the CA50 on the central side while the error is likely to occur at the CA10. Accordingly, it is reasonable to change only the content of the SA-CA10 feedback control as the noise countermeasure for this case. As described above, when the noise is evaluated with the calculation period divided into the early period α1 and the late period α2, the appropriate noise countermeasure can be performed in a state where the characteristics of the MFB data relating to the noise superimposition captured and the noise affecting each of the individual specific ratio combustion points (CA10 and CA50) more clearly grasped. More specifically, a case where the noise is superimposed on the early period α1 can be extracted, and thus the CA50 feedback control can be prevented from being unnecessarily stopped.

In addition, according to the processing of the above-described routine, it can be determined whether the variation factor of the CA50 is the noise or the combustion variation by the use of the evaluation of the degree of the correlation of the MFB data of the late period α2 and the evaluation of the variation degree of the CA50 (combustion center-of-gravity point) which is a specific ratio combustion point unlikely to be affected by the noise by nature. This determination of the variation factor of the CA50 is applicable to the processing for calculating the correlation index value $I_R$ with the MFB data en bloc such as the processing according to Embodiment 1 as well as the processing according to this embodiment for calculating the correlation index values $I_{R1}$, $I_{R2}$ with the calculation period divided. Still, this determination can result in an improvement in robustness when applied to the processing that is performed with the calculation period narrowed as in the processing according to this embodiment (that is, processing for raising the noise detectability).

Modification Example of Embodiment 2

In Embodiment 2 described above, the correlation index values $I_{R1}$, $I_{R2}$ are respectively calculated with both the early period α1 and the late period α2 used as targets. However, the calculation of the correlation index value $I_R$ may target only one of the early period α1 and the late period α2.

In Embodiment 2 described above, the correlation index values $I_{R1}$, $I_{R2}$ are respectively calculated with the early period α1 and the late period α2 used as targets and without the middle period α3 being used. However, when the calculation period is divided, the crank angle period excluded from the calculation targets of the correlation index values $I_{R1}$, $I_{R2}$ does not necessarily have to be disposed between the early period α1 and the late period α2 as in the example described above. In other words, the early period and the late period of the calculation period may be adjacent to each other with a certain specific ratio combustion point as a boundary. In addition, the early period and the late period may overlap each other in part. Furthermore, the crank angle period preceding the combustion period or the crank angle period following the combustion period may be used as at least one of the calculation periods with the combustion period (specified by the reference data) not included.

In Embodiment 2 described above, the ignition timing SA is used as the start point of the early period α1 and the opening timing EVO of the exhaust valve 22 is used as the end point of the late period α2. The noise detectability is raised when the calculation period is narrowed as described above. The start point of the early period α1 is not limited to the ignition timing SA but may follow an opening timing IVC of the intake valve 20, and the early period α1 can be said to be a crank angle period when the actually measured data of the MFB near the start point CA0 of the combustion starting by taking the opportunity of the ignition is to be evaluated. It can be said that the ignition timing SA is preferable as the start point of the early period α1 for this reason and from the point of view of shortening the calculation period. Likewise, with regard to the end point of the late period α2, the noise detectability can be said to be raised with the calculation period narrowed by the EVO being advanced. In a case where a crank angle timing that allows the termination of the combustion to be reliably determined is obtained in advance in view of the combustion variation and the like, the end point of the late period α2 may be that crank angle timing. It is preferable that this determination of the crank angle timing reflects the gist of the calculation period determination method described with reference to FIG. 11.

In Embodiment 2 described above, the ignition timing SA corresponds to the "first crank angle" according to the invention, the CA10 corresponds to the "first specific ratio combustion point" according to the invention, the early period α1 corresponds to the "first calculation period" according to the invention, the CA50 corresponds to the "second specific ratio combustion point" according to the invention, the late period α2 corresponds to the "second calculation period" according to the invention, and the opening timing EVO of the exhaust valve 22 corresponds to the "second crank angle" according to the invention. In addition, the CA50 feedback control corresponds to the "first engine control" according to the invention, the CA10 corresponds to the "control target combustion point" according to the invention, and the SA-CA10 feedback control corresponds to the "second engine control" according to the invention. Furthermore, the correlation index value $I_{R2}$ corresponds to the "second correlation index value" according to the invention, the determination value $I_{R2th}$ corresponds to the "second determination value" according to the invention, the correlation index value $I_{R1}$ corresponds to the "first correlation index value" according to the invention, and the determination value $I_{R1th}$ corresponds to the "first determination value" according to the invention. The "control means" according to the invention is realized by the ECU 40 executing the SA-CA10 feedback control and the CA50 feedback control, executing the processing of Step 114 in a case where the determination of Step 202 is satisfied, and executing the processing of Step 216 in a case where the determination of Step 202 is not satisfied and the determination of Step 212 is satisfied.

Embodiment 3

Hereinafter, Embodiment 3 of the invention will be described newly referring to FIGS. 13 and 14.

[Technique for Generating Reference Data of MFB According to Embodiment 3]

Embodiment 3 differs from Embodiments 1 and 2, in which the reference data of the MFB is generated by the use of the Wiebe function, in terms of a technique for generating the reference data of the MFB. The technique for generating the reference data of the MFB according to this embodiment can be applied to the noise detection technique described in Embodiment 1 or 2.

(Overview of Technique for Creating Reference Data of MFB)

Figure 13:
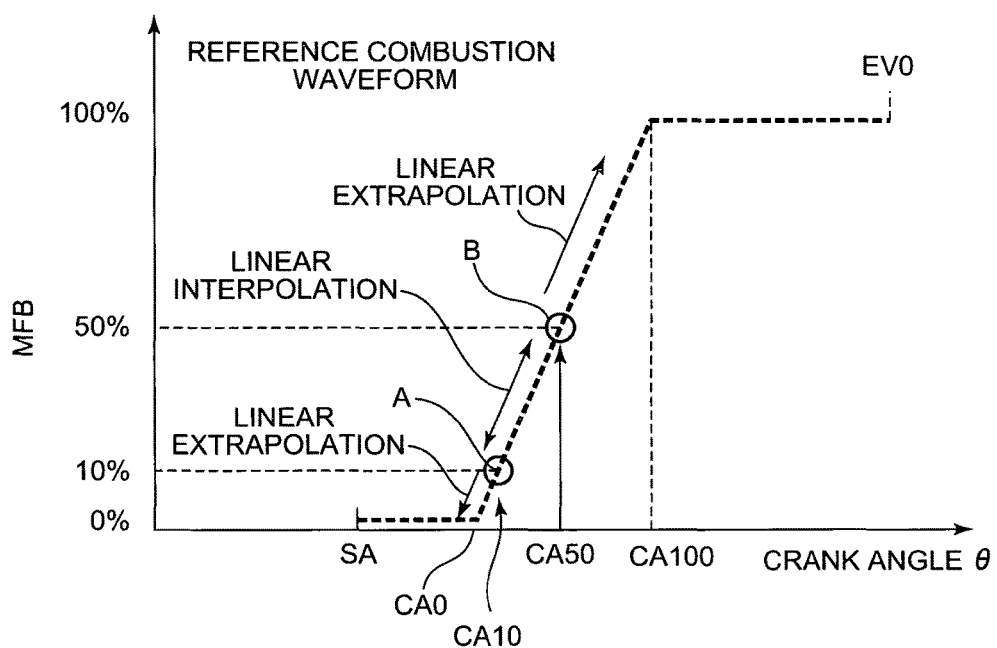
FIG. 13 is a diagram for showing an MFB reference data creation technique according to Embodiment 3 of the invention.

FIG. 13 is a diagram for showing the technique for creating the reference data of the MFB according to Embodiment 3. FIG. 13 shows an xy plane (hereinafter, referred to as an "MFB-θ plane") on which the crank angle θ is an x-coordinate value and the combustion mass ratio MFB is a y-coordinate value.

Even in this embodiment, the SA-CA10 feedback control and the CA50 feedback control are performed during the lean burn operation. As described above with reference to FIG. 3, the target CA50 that is the target value of the CA50 feedback control is determined as a value depending on the engine operating conditions (the target air-fuel ratio, the engine rotation speed, and the suctioned air amount). Likewise, the target SA-CA10 that is the target value of the SA-CA10 feedback control is determined as a value depending on the engine operating conditions. In the case of the lean burn operation during which the CA50 feedback control is executed, the indication value (target ignition timing) of the ignition timing SA in each combustion cycle is determined as a value in which the CA50 feedback control is reflected based on the basic ignition timing depending on the engine operating conditions. The CA10 can be calculated from the target SA-CA10 and the target ignition timing calculated in this manner. Still, the CA10 itself is no direct control target value of the SA-CA10 feedback control, and thus this CA10 will be referred to as a "specific CA10" below.

The CA50 is the crank angle at which the MFB is 50%, and the CA10 is the crank angle at which the MFB is 10%. Accordingly, when the value of the target CA50 and the value of the specific CA10 are determined, the point A and the point B on the MFB-θ plane illustrated in FIG. 13 where the target CA50 and the specific CA10 are respectively positioned are naturally determined. For the evaluation of the degree of the correlation of the actually measured data of the MFB, it is required that the reference data retains the data forming a pair with each data of the actually measured data acquired for each predetermined crank angle.

To this end, in this embodiment, linear interpolation and linear extrapolation are performed based on the two points A, B and the reference data of the MFB in the crank angle period from the combustion start point CA0 to the combustion end point CA100 is generated. The reference data of the crank angle period preceding the CA0 is generated as the data with an MFB of 0%, and the reference data of the crank angle period following the CA100 is generated as the data with an MFB of 100%. In this embodiment, the reference data of the MFB is generated in this manner. Then, the waveform through which the generated reference data passes is the waveform that is illustrated by the dashed line in FIG. 13.

(Specific Processing According to Embodiment 3)

Figure 14:
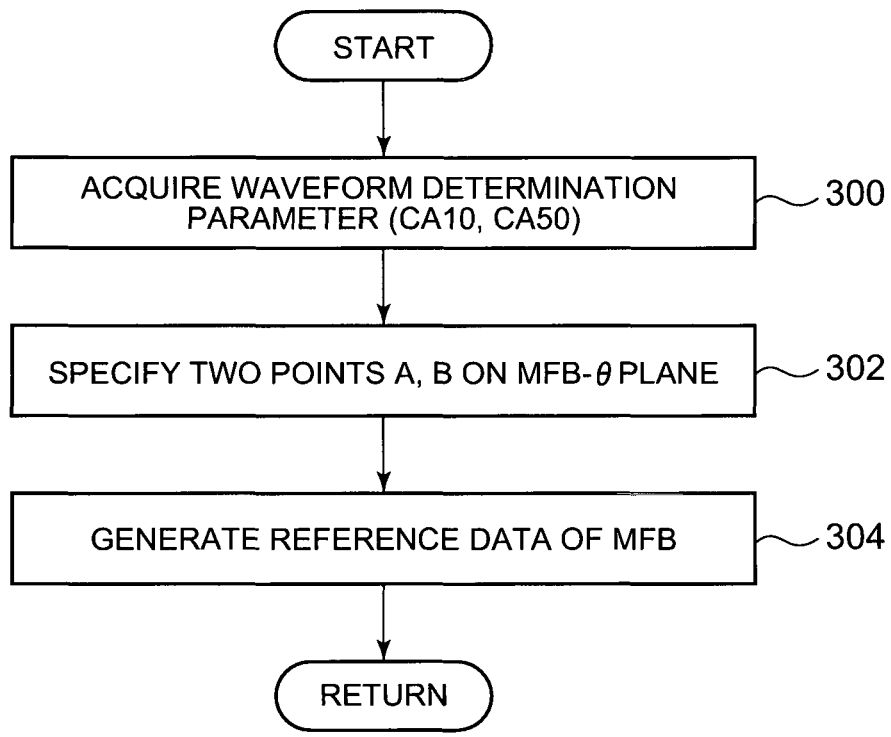
FIG. 14 is a flowchart of a routine that is executed according to Embodiment 3 of the invention.

FIG. 14 is a flowchart illustrating a routine that is executed by the ECU 40 according to Embodiment 3 of the invention. The processing for calculating the reference data of the MFB according to this routine can be used as an alternative technique for the processing of Step 104 in the routine illustrated in FIG. 8 or 12. Accordingly, this routine is performed for each combustion cycle in each cylinder in synchronization with the execution of the routine illustrated in FIG. 8 or 12 when the lean burn operation is performed.

In Step 300, the first step of the routine that is illustrated in FIG. 14, the ECU 40 acquires the target CA50 and the specific CA10 that are parameters determining the waveform of the reference data of the MFB. More specifically, the ECU 40 acquires the target CA50 that is separately calculated for the execution of the CA50 feedback control. In addition, the ECU 40 acquires the target SA-CA10 that is separately calculated for the execution of the SA-CA10 feedback control and the target ignition timing that is equivalent to the indication value of the final ignition timing in which the CA50 feedback control is reflected. Then, the ECU 40 calculates the specific CA10 by summing the target SA-CA10 with the target ignition timing.

When the air-fuel ratio changes toward the lean side herein, for example, the slope of the MFB waveform in the combustion period becomes smaller. The reference data of the MFB is required to deal with this change in the MFB waveform depending on the engine operating condition. Since the target CA50 is determined as a value depending on the engine operating condition, the effect of the engine operating condition is already reflected in the target CA50. Likewise, the effect of the engine operating condition is already reflected in the target SA-CA10. The basic ignition timing that is the base of the calculation of the target ignition timing is determined as a value depending on the engine operating conditions (the suctioned air amount and the engine rotation speed). A change in the MBT ignition timing resulting from a change in the air-fuel ratio is dealt with by a correction of the ignition timing based on the CA50 feedback control. Accordingly, it can be said that the effect of the engine operating condition is already reflected in the target ignition timing after the reflection of the CA50 feedback control. Accordingly, it can be said that the effect of the engine operating condition is already reflected in the specific CA10 determined depending on the target SA-CA10 and the target ignition timing. Since the effect of the engine operating condition is already reflected in the target CA50 and the specific CA10 as described above, it can be said that a change in the MFB waveform depending on the engine operating condition is already and naturally reflected in the reference data generated based on the target CA50 and the specific CA10.

Then, the ECU 40 proceeds to Step 302. In Step 302, a processing for identifying the two points A, B on the MFB-θ plane is performed by the use of the target CA50 and the specific CA10 acquired in Step 300.

Then, the ECU 40 proceeds to Step 304. In Step 304, the reference data of the MFB other than the two points A, B is generated based on the two points A, B. Specifically, the reference data in the crank angle period from the combustion start point CA0 to the combustion end point CA100 is generated as follows. The reference data of the crank angle period between the point A and the point B (from the CA10 to the CA50) is generated by the linear interpolation based on the two points A, B. The reference data of the crank angle period outside the crank angle period identified by the point A and the point B (from the CA0 to the CA10 and from the CA50 to the CA100) are generated by the linear extrapolation based on the two points A, B. In addition, as described above, the reference data of the crank angle period preceding the CA0 is generated as the data with an MFB of 0%, and the reference data of the crank angle period following the CA100 is generated as the data with an MFB of 100%.

According to the processing of the routine that is illustrated in FIG. 14 described above, the reference data of the MFB can be generated based on the target CA50 and the specific CA10. The target CA50 is a control target value that is used in the CA50 feedback control which is one of the engine controls performed by the internal combustion engine 10. Likewise, the specific CA10 is a specific ratio combustion point that is determined depending on the target SA-CA10 used in the SA-CA10 feedback control, which is one of the engine controls, and the target ignition timing determined by the CA50 feedback control. Advantages of the technique for generating the reference data of the MFB using the target CA50 and the specific CA10 as parameters of this nature will be described below in comparison to an MFB data generation technique according to the related art.

(Advantage of Technique for Generating Reference Data of MFB According to Embodiment 3)

As described in Embodiment 1, the use of the Wiebe function illustrated in Equation (6) is an example of the known MFB data generation techniques. This technique aims at the mathematization of combustion. As described in Embodiment 1 and the like, this technique is also applicable to the noise detection and the countermeasure against the detected noise according to the invention. However, this technique has the following problems. First of all, the ECU 40 is subjected to an increasing calculation load due to a large amount of calculation. When the combustion waveform (MFB waveform) is to be more accurately expressed by the use of the Wiebe function, the parameters including the shape parameter m and the constant c shown in Equation (6) should be appropriately set. To this end, a variety of engine operating condition parameters such as a combustion temperature and an in-cylinder gas flow velocity as well as the above-described suctioned air amount, engine rotation speed, air-fuel ratio, and ignition timing are required to be taken into account. The calculation of the combustion waveform using such a large number of engine operating condition parameters leads to an increase in the complexity of the mathematical formula. Accordingly, the calculation load increases.

Another problem of the known MFB data generation technique is the difficulty of ensuring the accuracy of the generated MFB data. This is because the combustion is difficult to be mathematized from the outset and it is difficult to extract every factor affecting the combustion. In this regard, it can be said that the known MFB data generation technique is less suitable for implementation than the technique according to this embodiment that has the following advantages.

For the following reasons, the technique for generating the reference data of the MFB according to this embodiment can be said to be more convenient to use and be capable of generating a reference data more suitable as a comparison target for the evaluation of the degree of the correlation of the actually measured data of the MFB.

First of all, the target CA50 has a value determined for the engine control that is assumed. In addition, the specific CA10 is determined depending on the target SA-CA10 with a value determined as is the case with the target CA50. In other words, the target CA50 and the specific CA10 that are parameters used as the bases of the reference data generation according to this embodiment do not have to be determined in advance for the reference data generation and require no complex calculation even when acquired on actual equipment. Accordingly, these can be said to be easily-acquired parameters. Based on these target CA50 and specific CA10, the reference data can be generated through the simple calculation of linear interpolation and linear extrapolation. Accordingly, the technique according to this embodiment can significantly reduce the amount of the calculation and significantly reduce the calculation load of the ECU 40 in comparison to the known technique described above. Accordingly, it can be said that this technique is more suitable for implementation.

In addition, the waveform of the MFB is characterized by linearly rising in the main combustion period (from the CA10 to the CA90). Accordingly, it can be said that the reference data can be conveniently acquired while the characteristics of the MFB waveform are appropriately retained when the reference data in the main combustion period is generated by the use of the linear interpolation and the linear extrapolation. More precisely, as schematically illustrated in FIG. 6 and the like, the combustion waveform is bent in a slightly circular form in the crank angle period from the CA0 to around the CA10 and in the crank angle period from the CA90 to around the CA100 (refer to FIG. 2) instead of being bent at one point at the combustion start point CA0 and the combustion end point CA100. However, these crank angle periods are short periods in the entire combustion period and the slight circularity of the MFB waveform in the crank angle periods can be said to have no significant effect from the point of view of the comparison of the degree of the correlation of the MFB data. Accordingly, it can be said that the generation of the reference data by the linear extrapolation as in this embodiment will suffice even for these crank angle periods.

Hereinafter, a reason for which it can be said that the reference data more suitable as the comparison target for the evaluation of the degree of the correlation of the actually measured data of the MFB can be generated by the use of the technique for generating the MFB data according to this embodiment will be described. The target CA50 is the target value for the assumed CA50 feedback control. In the SA-CA10 feedback control, the fuel injection quantity is controlled so that the actually measured SA-CA10 becomes the target SA-CA10 and the ignition timing is also controlled to correspond to the target ignition timing that is obtained through the CA50 feedback control. Accordingly, it can be said that the CA10 is indirectly controlled by the execution of the SA-CA10 feedback control and the CA50 feedback control to become the specific CA10 determined depending on the target SA-CA10 and the target ignition timing. In this regard, the specific CA10 can be said to be equivalent to an indirect control target value. According to the above description, it can be said that, in a case where the SA-CA10 feedback control and the CA50 feedback control are executed, the fuel injection quantity and the ignition timing are controlled by these controls so that the actually measured waveform of the MFB becomes close to the waveform of the reference data generated based on the target CA50 and the specific CA10.

As described above, the effect of the engine operating condition is already reflected in the target CA50 and the specific CA10, and thus the change in the MFB waveform depending on the engine operating condition is also already reflected in the reference data generated based on the target CA50 and the specific CA10. According to the above description, it can be said that the technique according to this embodiment allows the combustion waveform (that is, an ideal combustion waveform) aimed by the assumed engine control (SA-CA10 feedback control and CA50 feedback control herein) to be uniquely determined based on the target CA50 and the specific CA10 by directly generating the waveform of the reference data from the target CA50 and the specific CA10. In this embodiment, the MFB data of this ideal combustion waveform is referred to as the reference data. Accordingly, the technique according to this embodiment can result in the generation of the reference data more suitable as the comparison target for the evaluation of the degree of the correlation of the actually measured data of the MFB than in a case where the MFB data generated with the known technique described above is used.

When the reference data generation technique according to this embodiment that has the above-described advantages is used as an alternative, the following advantages can be added to the noise detection technique according to Embodiment 1 or 2 described above.

Modification Example of Embodiment 3

In Embodiment 3 described above, the reference data of the combustion period (from the CA0 to the CA100) is generated based on the target CA50 and the specific CA10. However, the two specific ratio combustion points that are used in the generation of the reference data of the combustion period are not limited to the CA50 and the CA10 insofar as the specific ratio combustion points are used in the assumed engine control, and may be any specific ratio combustion point (such as the CA90) selected between the CA0 and the CA100. Still, as described above, the MFB waveform linearly changes in the main combustion period (from the CA10 to the CA90) to be exact, and thus it is preferable that the two specific ratio combustion points which are the bases of the reference data generation are selected between the CA10 and the CA90.

In Embodiment 3 described above, the reference data of the entire combustion period from the CA0 to the CA100 is generated by the use of the linear interpolation and the linear extrapolation based on the target CA50 and the specific CA10. However, strictly speaking, the MFB waveform in the crank angle period from the CA0 to the CA10 and in the crank angle period from the CA90 to the CA100 shows the slight circularity as described above, and the reference data of at least one of these crank angle periods may be generated in an aspect of reproducing the slightly circular waveform by the use of a quadratic function or the like instead of the linear interpolation or the linear extrapolation.

In Embodiment 3 described above, both the linear interpolation and the linear extrapolation are used for the generation of the reference data of the MFB in the combustion period. However, either one of the linear interpolation and the linear extrapolation is used depending on the positions of the two specific ratio combustion points that are the bases of the reference data generation. For example, only the linear interpolation is used in a case where the reference data is generated based on the CA0 and the CA100 with the entire combustion period used as a target. In addition, only the linear extrapolation is used in a case where two reference data corresponding to two actually measured data adjacent to each other in the combustion period, which are considered to be less likely to be selected in actuality, are selected as the two specific ratio combustion points.

In Embodiment 3 described above, the target CA50 and the specific CA10 are used as the bases of the reference data generation. However, both may be control target values or both may be specific ratio combustion points determined depending on the control target values, that is, indirect control target values depending on the two specific ratio combustion points used in the assumed engine control.

In Embodiment 3 described above, the CA10 corresponds to the "third specific ratio combustion point" according to the invention, the SA-CA10 corresponds to the "first parameter" according to the invention, the CA50 corresponds to the "fourth specific ratio combustion point" according to the invention, the specific CA10 corresponds to the "first target value" and the "third specific ratio combustion point specified from the target value of the first parameter" according to the invention, the target CA50 corresponds to the "second target value" and the "target value of the fourth specific ratio combustion point" according to the invention, the crank angle period from the ignition timing SA to the CA0 corresponds to the "third crank angle period" according to the invention, and the crank angle period from the CA100 to the EVO corresponds to the "fourth crank angle period" according to the invention. In a case where a parameter defined based on the CA50 (such as an SA-CA50) is used, the SA-CA50 corresponds to the "second parameter" according to the invention although this differs from the aspect of Embodiment 3. In a case where a target CA10 is set in the CA10 itself, the target CA10 corresponds to the "target value of the third specific ratio combustion point" according to the invention although this differs from the aspect of Embodiment 3. In a case where a target SA-CA50 is set in the SA-CA50 itself, for example, a specific CA50 that is defined from the target SA-CA50 corresponds to the "fourth specific ratio combustion point specified from the target value of the second parameter" according to the invention.

Other Embodiments

In a case where the correlation index value $I_R$ is lower than the determination value $I_{Rth}$ in Embodiment 1 described above, the respective correction amounts of the SA-CA10 feedback control and the CA50 feedback control are maintained at the previous values such that the actually measured CA10 or the actually measured CA50 of the combustion cycle in which the correlation index value $I_R$ is calculated is prohibited from being reflected in each feedback control. However, this prohibition aspect is not limited to the example of maintaining the previous values of the correction amounts and may be, for example, turning each of the correction amounts to 0. When the correction amounts are maintained at the previous values, the feedback of the actually measured CA10 of the present combustion cycle or the like is stopped but the adjustment of the fuel injection quantity or the like using the past feedback result continues. Meanwhile, the use of the past feedback result itself is prohibited when the correction amount is 0. In addition, the feedback control may be performed with a feedback gain being lowered instead of the feedback control being prohibited. This technique corresponds to an example of lowering the degree of the reflection of the actually measured CA10 or the like of the present combustion cycle in the SA-CA10 feedback control or the like in comparison to a case where the correlation index value $I_R$ is equal to or higher than the determination value $I_{Rth}$. The above description applies in the same manner to the countermeasures during noise detection according to Embodiments 2 and 3.

In Embodiments 1 to 3 described above, the SA-CA10 feedback control and the CA50 feedback control have been described as examples. However, the "engine control for controlling the actuator of the internal combustion engine based on the actually measured value of the specific ratio combustion point" according to the invention is not limited to the above-described feedback control. In other words, the specific ratio combustion point CAα can be used in a determination of a torque fluctuation or an accidental fire in the internal combustion engine. Accordingly, the above-described engine control includes the control of a predetermined actuator that is performed in response to the result of this determination. In addition, the specific ratio combustion point CAα that is used as a target of the "engine control" according to the invention is not limited to the CA10 and the CA50 and may be any value selected within the range of the CA0 to the CA100, examples of which include the CA90 that is a 90% combustion point. Furthermore, a combination of a plurality of the specific ratio combustion points CAα may be used, examples of which include the CA10-CA50 that is the crank angle period from the CA10 to the CA50.

In Embodiments 1 to 3 described above, an example in which the degree of the correlation of the MFB data is evaluated for each cylinder by the use of the cross-correlation function has been described. However, the execution of the evaluation of the degree of the correlation of the MFB data may target any representative cylinder and a predetermined countermeasure may be taken for all the cylinders in the event of the noise detection.

In Embodiments 1 to 3 described above, an example in which the fuel injection quantity is adjusted by the SA-CA10 feedback control has been described. However, the adjustment target of the SA-CA10 feedback control that is used for the combustion control during the lean burn operation is not limited to the fuel injection quantity and may be the suctioned air amount or ignition energy. When the fuel injection quantity or the suctioned air amount is the adjustment target, this feedback control can be positioned as an air-fuel ratio control. In addition, the specific ratio combustion point CAα that is used in this feedback control is not necessarily limited to the CA10 and may be another combustion point. Still, for the following reason, it can be said that the CA10 is better than the other combustion points with regard to application to this feedback control. In a case where the combustion point in the main combustion period (CA10-CA90) following the CA10 is used, the obtained crank angle period is significantly affected by a parameter (such as an EGR rate, an intake temperature, and a tumble ratio) affecting the combustion when flames spread. In other words, the crank angle period that is obtained in this case is not one focusing purely on the air-fuel ratio and is vulnerable to disturbances. In addition, as described above, the combustion points near the combustion start point CA0 and the combustion end point CA100 are likely to be subjected to the error due to the effect of the noise superimposed on the output signal from the in-cylinder pressure sensor 30. This effect of the noise decreases from the combustion start point CA0 and the combustion end point CA100 toward the central side of the combustion period. In view of these points, it can be said that the CA10 is the best.

In Embodiments 1 to 3 described above, the evaluation of the degree of the correlation of the MFB data based on the correlation index value $I_R$ and the like is performed during the lean burn operation resulting from the execution of the SA-CA10 feedback control and the CA50 feedback control. However, this evaluation may be performed during a theoretical air-fuel ratio combustion operation or the like as well as during the lean burn operation on the condition that the engine control is performed based on the specific ratio combustion point CAα.

What is claimed is:

1. A control device for an internal combustion engine comprising:
    an in-cylinder pressure sensor configured to detect an in-cylinder pressure of the internal combustion engine;
    a crank angle sensor configured to detect a crank angle of the internal combustion engine; and
    an electronic control unit configured to calculate actually measured data of a combustion mass ratio synchronized with the crank angle based on the in-cylinder pressure detected by the in-cylinder pressure sensor and the crank angle detected by the crank angle sensor, the electronic control unit being configured to calculate an actually measured value of a specific ratio combustion point as the crank angle at which the combustion mass ratio reaches a specific ratio based on the actually measured data of the combustion mass ratio, the electronic control unit being configured to execute an engine control for controlling an actuator of the internal combustion engine based on the actually measured value of the specific ratio combustion point, the electronic control unit being configured to calculate a correlation index value showing a degree of a correlation between the actually measured data of the combustion mass ratio and reference data of the combustion mass ratio based on an operating condition of the internal combustion engine, and the electronic control unit being configured to, in a case where the correlation index value is lower than a determination value, prohibit the actually measured value of the specific ratio combustion point pertaining to a combustion cycle in which the correlation index value is calculated from being reflected in the engine control or reduce a degree of the reflection in the engine control compared to a case where the correlation index value is equal to or higher than the determination value.

2. The control device for the internal combustion engine according to claim 1,
    wherein the electronic control unit is configured to calculate the correlation index value by using a cross-correlation function.

3. The control device for the internal combustion engine according to claim 1,
    wherein a calculation period as a crank angle period as a target of the calculation of the correlation index value includes at least one of a first calculation period as the crank angle period from a first crank angle preceding a combustion start point to a first specific ratio combustion point following the combustion start point and a second calculation period as the crank angle period from a second specific ratio combustion point following the first specific ratio combustion point to a second crank angle following a combustion end point, and
    wherein the combustion mass ratio at the first specific ratio combustion point is lower than the combustion mass ratio at the second specific ratio combustion point and the crank angle period from the first specific ratio combustion point to the second specific ratio combustion point includes at least a pair of data relating to the actually measured data and the reference data of the combustion mass ratio as a target of the calculation of the correlation index value.

4. The control device for the internal combustion engine according to claim 3,
    wherein the engine control includes a first engine control based on a combustion center-of-gravity point as one of the specific ratio combustion points and a second engine control based on a control target combustion point included in the crank angle period from the combustion start point to the first specific ratio combustion point and positioned ahead of the combustion center-of-gravity point, and
    wherein the electronic control unit is configured to prohibit an actually measured value of the combustion center-of-gravity point and an actually measured value of the control target combustion point pertaining to the combustion cycle in which the correlation index value is calculated from being respectively reflected in the first engine control and the second engine control or reduce degrees of the respective reflections in the first engine control and the second engine control compared to the case where the correlation index value is equal to or higher than the determination value in a case where the correlation index value calculated with the second calculation period used as a target is lower than the determination value.

5. The control device for the internal combustion engine according to claim 3,
    wherein the engine control includes the first engine control based on the combustion center-of-gravity point as one of the specific ratio combustion points and the second engine control based on the control target combustion point included in the crank angle period from the combustion start point to the first specific ratio combustion point and positioned ahead of the combustion center-of-gravity point, and
    wherein the electronic control unit is configured to prohibit the actually measured value of the control target combustion point pertaining to the combustion cycle in which a first correlation index value is calculated from being reflected in the second engine control or reduce a degree of the reflection in the second engine control compared to a case where a second correlation index value is equal to or higher than a second determination value and the first correlation index value is equal to or higher than a first determination value in a case where the second correlation index value calculated with the second calculation period used as the target is equal to or higher than the second determination value and the first correlation index value calculated with the first calculation period used as the target is lower than the first determination value.

6. The control device for the internal combustion engine according to claim 1,
    wherein the engine control includes a third engine control based on a third specific ratio combustion point or a first parameter defined based on the third specific ratio combustion point and a fourth engine control based on a fourth specific ratio combustion point or a second parameter defined based on the fourth specific ratio combustion point,
    wherein the reference data of the combustion mass ratio pertaining to at least a crank angle period from a 10% combustion point to a 90% combustion point in a combustion period is generated based on a first target value and a second target value and by at least one of linear interpolation and linear extrapolation,
    wherein the first target value is one of the third specific ratio combustion points specified from a target value of the third specific ratio combustion point or a target value of the first parameter, wherein the second target value is one of the fourth specific ratio combustion points specified from a target value of the fourth specific ratio combustion point or a target value of the second parameter, wherein the reference data of the combustion mass ratio pertaining to the third crank angle period is data with a combustion mass ratio of 0% in a case where the reference data of the combustion mass ratio includes a third crank angle period as the crank angle period preceding the combustion period, and wherein the reference data of the combustion mass ratio pertaining to the fourth crank angle period is data with a combustion mass ratio of 100% in a case where the reference data of the combustion mass ratio includes a fourth crank angle period as the crank angle period following the combustion period.

7. The control device for the internal combustion engine according to claim 6, wherein the third specific ratio combustion point and the fourth specific ratio combustion point are specific ratio combustion points in the crank angle period from the 10% combustion point to the 90% combustion point.

* * * * *